United States Patent
Jun et al.

(10) Patent No.: US 9,924,003 B2
(45) Date of Patent: Mar. 20, 2018

(54) ELECTRONIC DEVICE HAVING KEY MODULE

(71) Applicant: Samsung Electronics Co., Ltd, Gyeonggi-do (KR)

(72) Inventors: Yun-Jae Jun, Gyeongsangbuk-do (KR); Jung-Woong Hyun, Gyeongsangbuk-do (KR); Soo-Gyu Lee, Gyeongsangbuk-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/331,768

(22) Filed: Oct. 21, 2016

(65) Prior Publication Data
US 2017/0118319 A1  Apr. 27, 2017

(30) Foreign Application Priority Data

Oct. 21, 2015  (KR) .................. 10-2015-0147009

(51) Int. Cl.
| H04M 1/00 | (2006.01) |
| H04B 1/38 | (2015.01) |
| H04M 1/02 | (2006.01) |
| H04B 1/3827 | (2015.01) |
| H04M 1/18 | (2006.01) |
| H04M 1/23 | (2006.01) |

(52) U.S. Cl.
CPC ........ *H04M 1/0249* (2013.01); *H04B 1/3827* (2013.01); *H04M 1/18* (2013.01); *H04M 1/236* (2013.01); *H04B 2001/3894* (2013.01)

(58) Field of Classification Search
CPC . H04B 1/3827; H04B 1/3894; H04M 1/0249; H04M 1/236; H04M 1/3827; H04M 2250/18
USPC .................. 455/90.3, 575.1, 575.8
See application file for complete search history.

(56) References Cited

U.S. PATENT DOCUMENTS

| 5,401,929 | A  * | 3/1995  | Chen .................... H01H 13/705 200/534 |
| 7,599,721 | B2 * | 10/2009 | Taki .................... H04M 1/0237 455/575.1 |
| 8,284,568 | B2   | 10/2012 | Xiao |
| 8,798,690 | B2 * | 8/2014  | Cho ........................ H04M 1/23 455/575.1 |
| 9,203,938 | B2 * | 12/2015 | Strawn ................ H04M 1/0235 |

FOREIGN PATENT DOCUMENTS

KR  10-2009-0118294  11/2009

* cited by examiner

*Primary Examiner* — Quochien B Vuong

(57) ABSTRACT

Disclosed are various embodiments of an electronic device including a key module for hermetically sealing an inside of the device. According to one embodiment, a portable device includes: a front cover; a rear cover; and a bezel that surrounds at least a portion of a space formed between the front and rear covers, and includes a first portion and an opening. Disposed within the space is a display including a screen exposed through the front cover; a plate including a support surface with multiple protrusions and an accommodation hole that provides a pathway leading to the opening; a key; and a first member including a via hole through which a portion of the key passes. When the key is inserted into the pathway and moved in a first direction, the inside space of the electronic device is hermetically sealed from the outside.

23 Claims, 25 Drawing Sheets

ELECTRONIC DEVICE HAVING KEY MODULE

CROSS-REFERENCE TO RELATED APPLICATION(S) AND CLAIM OF PRIORITY

The present application is related to and claims the priority under 35 U.S.C. § 119(a) to Korean Application Serial No. 10-2015-0147009, which was filed in the Korean Intellectual Property Office on Oct. 21, 2015, the entire content of which is hereby incorporated by reference.

TECHNICAL FIELD

Various embodiments of the present disclosure relate to a key input device mounted on an electronic device.

BACKGROUND

Recently, terminals with novel functions are developed rapidly, and as the distribution of the terminals are expanded, the terminals capture a gradually increasing share of people's lives.

In addition, a terminal, such as a smart phone, that is popularized with the development of the mobile communication technology uses various keys that are used by being provided on the rear face and the side face of the terminal as well as being provided on the front face of the terminal.

Further, as users' needs for terminals are gradually diversified, a key used in such terminals includes a waterproof structure in order to prevent a fluid from infiltrating into the terminals.

SUMMARY

A key used for a terminal is manufactured by using a lot of components, such as a key, a spring, a washer, an O-ring, and an E-ring in order to secure a waterproof performance. For example, for the purpose of waterproofing through an O-ring, additional components, such as a washer to fix the position of the O-ring, is essentially needed. However, in a terminal, in which a waterproof performance is secured by using such additional components, a mounting space within the terminal is greatly limited when all of the components described above are applied, and a problem of a protrusion amount of a key occurs due to an accumulated tolerance. For example, in a structure where it is difficult to externally mount a washer and a spring like a side key, it is difficult to apply all of the main components.

Various embodiments of the present disclosure are to provide a waterproof function that may utilize a mounting space in a terminal that includes a key module.

According to various embodiments of the present disclosure, an electronic device may include: a front cover that forms a front face of the electronic device; a rear cover that forms a rear face of the electronic device; a bezel that surrounds at least a portion of a space formed between the front cover and the rear cover, and includes a first portion including an opening; a display device that is disposed within the space, and includes a screen area exposed through the front cover; a plate that includes a support surface parallel to the rear cover within the space and includes first and second protrusions disposed adjacent to the opening and spaced apart from each other, the first and second protrusions being disposed not to be in contact with the first portion and to include an accommodation hole that provides a pathway leading to the opening; a key having a size and shape to pass through the pathway and the opening, and inserted into the pathway and the opening to be movable in a first direction; and a first member that includes a via hole through which a portion of the key passes and is disposed between the first portion of the bezel and the first protrusion and between the first portion of the bezel and the second protrusion to hermetically seal the space from outside of the electronic device.

In an embodiment of the present disclosure, the electronic device may further include a dome button unit disposed inside the space. The dome button unit may be configured to be partially deformed by a movement of the key when the key receives pressure in the first direction from the outside.

In an embodiment of the disclosure, the electronic device may further include a flexible printed circuit board disposed adjacent to the dome button unit, and the flexible printed circuit board may be configured such that, when the key receives the pressure in the first direction from the outside, an electric signal is generated by the dome button unit.

In an embodiment of the disclosure, the rear cover and the bezel may be integrally formed, and the rear cover and the bezel may include an identical metal material.

In an embodiment of the disclosure, the key may include a key button disposed on the bezel and a rod inserted into the space and moving in the first direction, and the rod may include a step formed on an outer surface thereof to prevent separation of the rod inserted into the plate.

In an embodiment of the disclosure, the first member may be inserted into and disposed in a seating recess provided inside the bezel, and may be formed to elastically enclose a periphery of the rod so as to block a fluid infiltrating into the inside of the electronic device.

In an embodiment of the disclosure, the first member may include a first waterproof contact face formed by being in contact with the key on the first direction where the key moves, and a second waterproof contact face formed by being in contact with an inside of the bezel in a second direction that is different from the first direction.

In various embodiments, centers of the opening of the bezel, the via hole of the first member, and the accommodation hole of the plate may be arranged on the same line.

According to various embodiments of the present disclosure, in the plate, the support flat surface may support the first and second protrusions, and a dome button unit may be provided in an accommodation space formed between the first and second protrusions to come in contact with the rod that moves in the first direction.

In an embodiment of the present disclosure, the first protrusion may be provided with at least one accommodation hole such that at least a portion of the rod is accommodated and coupled to the accommodation space.

In an embodiment of the present disclosure, the plate may further include a second member coupled to the step formed on the outer surface of the rod when the rod is inserted into the accommodation hole to prevent the key from being separated to the outside.

According to various embodiments of the present disclosure, in a key module, an accessory component such as a washer or an E-ring is manufactured and arranged integrally with another component so that the number of components can be reduced compared to the conventional configuration, and can address a limitation of a mounting space so that the cost of components can be reduced and a product can be slimmed.

According to various embodiments of the present disclosure, due to the integral key module structure, a key waterproof function can be implemented with a simple structure.

According to various embodiments of the present disclosure, due to the integral key module structure, various designs that may satisfy a customer's needs may be implemented by using the mounting space within the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
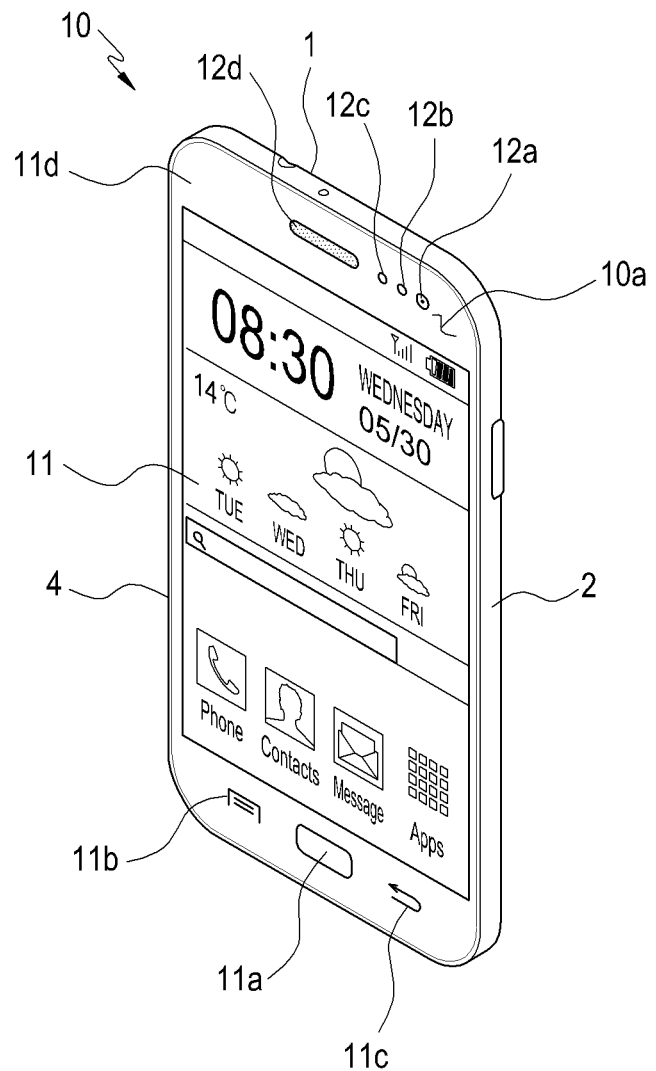
FIG. 1 is a perspective view illustrating the front face of an electronic device that is provided with a key module according to various embodiments of the present disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 2:
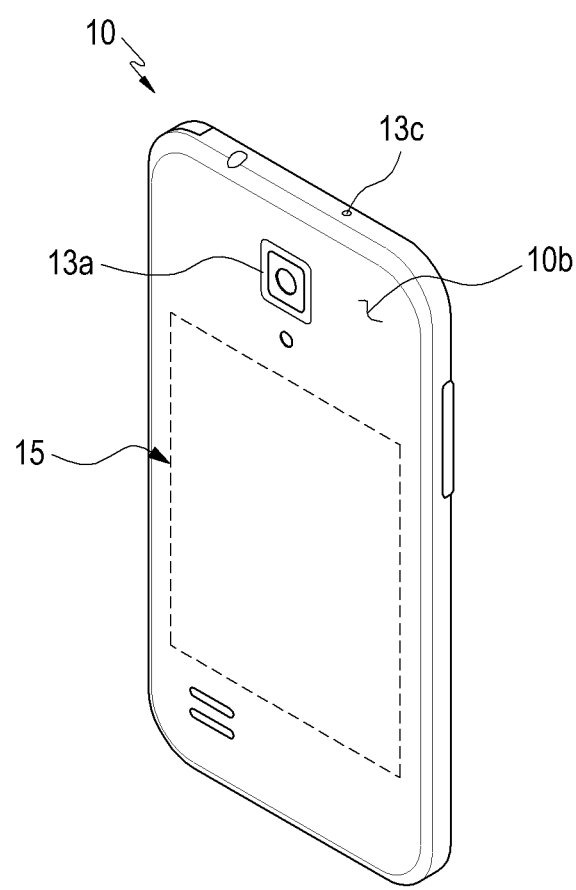
FIG. 2 is a perspective view illustrating the rear face of an electronic device that is provided with a key module according to various embodiments of the present disclosure.

FIG. 1 is a perspective view illustrating the front face of an electronic device. FIG. 2 is a perspective view illustrating the rear face of the electronic device. The electronic device 10 may be, for example, a smart phone or a wearable device. Components of an electronic device, such as a smart phone, will be described with reference to FIGS. 1 and 2.

As illustrated in FIG. 1, an electronic device 10 may include a touch screen 11 that is disposed on the center of the front face thereof. The touch screen 11 may occupy a great portion of the front face of the electronic device 10. FIG. 1 illustrates an example in which a main home screen is displayed on the touch screen 11. The main home screen refers to the first screen that is displayed on the touch screen 11 when the power of the electronic device 10 is turned on. In addition, when the electronic device 10 has several pages of different home screens, the main home screen may be the first home screen among the several pages of home screens. The home screen may display shortcut icons to execute frequently used applications, a main menu switching key, time, weather, or the like. The main menu switching key may cause the main screen to be displayed on the touch screen 11. In addition, in the upper end of the touch screen 11, status bars may be formed to indicate the statuses of the device, such as a battery charge status, a received signal strength, and the current time. Below the touch screen 11, a home key 11*a*, a menu button 11*b*, and a back button 11*c* may be formed.

The home key 11*a* may cause the main home screen to be displayed on the touch screen 11. For example, when the home key 11*a* is touched in the state where any home screen, which is different from the main home screen, or the menu screen is displayed on the touch screen 11, the main home screen may be displayed on the touch screen 11. In addition, when the home key 11*a* is touched while applications are executed on the touch screen 11, the main home screen may be displayed on the touch screen 11. In addition, the home key 11*a* may be used for causing the touch screen 11 to display the most recently used application or a task manager. The menu button 11*b* may provide a connection menu that may be used on the touch screen 11. The connection menu may include, for example, a widget addition menu, a background screen change menu, a retrieve menu, an edition menu, or an environment setting menu. The back button 11*c* may cause the screen, which was executed just prior to the currently executed screen, to be displayed, or may cause the most recently used application to be terminated.

According to various embodiments, as illustrated in FIG. 1 described above, a first camera 12*a*, an illuminance sensor 12*b*, or a proximity sensor 12*c* may be arranged in the upper end region 11*d* of the front face of the electronic device 10. In various embodiments, the electronic device 10 may include a front cover 10*a* as illustrated in FIG. 1 and/or a back cover 10*b*, as illustrated in FIG. 2.

As illustrated in FIG. 2, on the rear face of the electronic device 10, a second camera 13*a*, a flash, or a speaker 13*c* may be arranged. When the electronic device 10 is configured such that a battery pack is detachably mounted thereon, the rear face of the electronic device 10 may be a detachable battery cover 15.

An electronic device 101, for example, the electronic device 10, within the network environment 100 in various embodiments will be described with reference to FIG. 3. The electronic device 101 may include a bus 110, a processor 120, a memory 130, an input/output interface 150, a display 160, and a communication interface 170. In various embodiments of the disclosure, the electronic device 101 may omit at least one of the above-mentioned components or may additionally include other components.

The bus 110 may include, for example, a circuit that interconnects the above-mentioned components 110 to 170 and transmits communication (e.g., a control message and/or data) among the components.

The processor 120 may include one or more of a Central Processing Unit (CPU), an Application Processor (AP), and a Communication Processor (CP). The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. According to one embodiment, the memory 130 may store software and/or a program 140. The program 140 may include, for example, a kernel 141, a middleware 143, an Application Programming Interface (API) 145, and/or an application program (or an "application") 147. At least one of the kernel 141, the middleware 143, and the API 145 may be referred to as an Operating System (OS).

The kernel 141 may control or manage, for example, system resources (e.g., the bus 110, the processor 120, or the memory 130) that are used for executing operations or functions implemented in the other programs (e.g., the middleware 143, the API 145, or the application programs 147). In addition, the kernel 141 may provide an interface that allows the middleware 143, the API 145, or the application programs 147 to access individual components of the electronic device 101 so as to control or manage the system resources.

The middleware 143 may play an intermediary role such that, for example, the API 145 or the application programs 147 may communicate with the kernel 141 so as to exchange data.

In addition, the middleware 143 may process one or more task requests that are received from the application programs 147, according to priority. For example, the middleware 143 may assign the priority to be capable of using a system resource of the electronic device 101 (e.g., the bus 110, the processor 120, or the memory 130) to at least one of the application programs 147. For example, the middleware 143 may perform scheduling, load balancing, or the like for the one or more task requests by processing the one or more requests according to the assigned priority.

The API 145 is, for example, an interface that allows the applications 147 to control functions provided from the kernel 141 or the middleware 143, and may include, for example, one or more interfaces or functions (e.g., commands) for a file control, a window control, an image processing, or a character control.

The input/output interface 150 may serve as an interface to transmit commands or data, which are entered from, for example, a user or any other external device, to the other component(s) of the electronic device 101. Also, the input/output interface 150 may output commands or data, which are received from the other component(s) of the electronic device 101, to the user or the other external device.

The display 160 may include, for example, a Liquid Crystal Display (LCD), a Light Emitting Diode (LED) display, an Organic Light Emitting Diode (OLED) display, or a MicroElectroMechanical systems (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 101 and an external device (e.g., a first external electronic device 102, a second external electronic device 104, or a server 106). For example, the communication interface 170 may communicate with the external device (e.g., the second external electronic device 104 or the server 106) by being connected with a network 162 through wired or wireless communication.

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short range communication. The short range communication may include at least one of, for example, Wireless Fidelity (WiFi), Bluetooth® (BT), Near Field Communication (NFC), and Global Navigation Satellite System (GNSS™). GNSS may include, for example, at least one of Global Positioning System (GPS), Global navigation satellite system (Glonass™), Beidou™ navigation satellite system (hereinafter, "Beidou"), Galileo™, and the European global satellite-based navigation system, according to, for example, a use area or band width. Hereinafter, "GPS" may be interchangeably used with "GNSS" below. The wired communication may use at least one of, for example, Universal Serial Bus (USB), High Definition Multimedia Interface (HDMI), Recommended Standard 232 (RS-232), and Plain Old Telephone Service (POTS). The network 162 may include a telecommunication network (e.g., at least one of a computer network (e.g., LAN or WAN), the internet, and a telephone network).

Each of the first and second external electronic devices 102 and 104 may be a type of device that is the same as or different from the electronic device 101. According to one embodiment, the server 106 may include a group of one or more servers. According to various embodiments, all or some of the operations to be executed by the electronic device 101 may be executed in another electronic device or a plurality of other electronic devices (e.g., the electronic devices 102 and 104 or the server 106). According to one embodiment, in the case where the electronic device 101 should perform a certain function or service automatically or by a request, the electronic device 101 may request some functions or services that are associated therewith from the other electronic devices (e.g., the electronic devices 102 and 104 or the server 106), instead of, or in addition to, executing the functions or service by itself. The other electronic devices (e.g., the electronic devices 102 and 104 or the server 106) may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

The electronic device 10 to be described below may be formed of any one of the above-mentioned wearable device, a notebook computer, a netbook computer, a smart phone, a tablet PC, Galaxy Tab®, I-Pad®, and a wireless charging device. In the present embodiment, the electronic device 10 may be formed of the smart phone.

The wireless charging device according to various embodiments of the present disclosure refers to a device that wirelessly transmits/receives power within a short distance to charge the electronic device.

In an embodiment, in the electronic device 10, a bezel region may be reduced or minimized to implement the design luxuriously while somewhat increasing a display unit of the electronic device. In an embodiment, a flexible display unit may be provided in order to implement a convex or concave display unit.

For example, a peripheral portion of the display unit may be bent so that a screen area may be provided so that the screen area may be used in a state enlarged to a side face portion of the display unit. As the screen area of the display unit is bent so that the screen area is also provided to the side face portion, the screen area may be used in an enlarged state, or the side face portion may be used for a separate screen. Further, a luxurious design may be implemented. In other words, the display unit may include a first view area, and second view areas provided on the opposite sides of the first screen area.

In addition, the key module 300 applied to the electronic device 10 is a data input device, and may be formed of a touch pad, a touch screen, or the like, in addition to a key input device to which data may be input mainly by a finger pushing operation. Basically, the key input device used for data input includes an arrangement of a plurality of key arrays. Such keys are constituted with a send (SND) key, which is a communication start button, a cancel key, a correction key (CLR), a number key, a character key, an end (END) key, a power (PWR) key, etc. In addition, the key input device is provided with a keypad on the front face of the terminal, and is provided with a plurality of side keys to support the function of the keypad and each to play a roll of a function key.

In an embodiment of the disclosure, the key module 300 will be described with the above-described side keys by way of an example. However, the key module 300 is not limited thereto, and may be variously applied as long as it is a key module to be driven for data input. In the present embodiment, descriptions will be made with reference to a key module 300 that is integrally provided with a waterproof function.

In addition, in various embodiments, a case including the front cover 10a, the rear cover 10b, a bezel, etc. in the electronic device 10 will be referred to as a main body. In the following, descriptions will be made with reference to a configuration of the key module 300 provided in the electronic device 10 according to various embodiments of the present disclosure, as an example.

Figure 4:
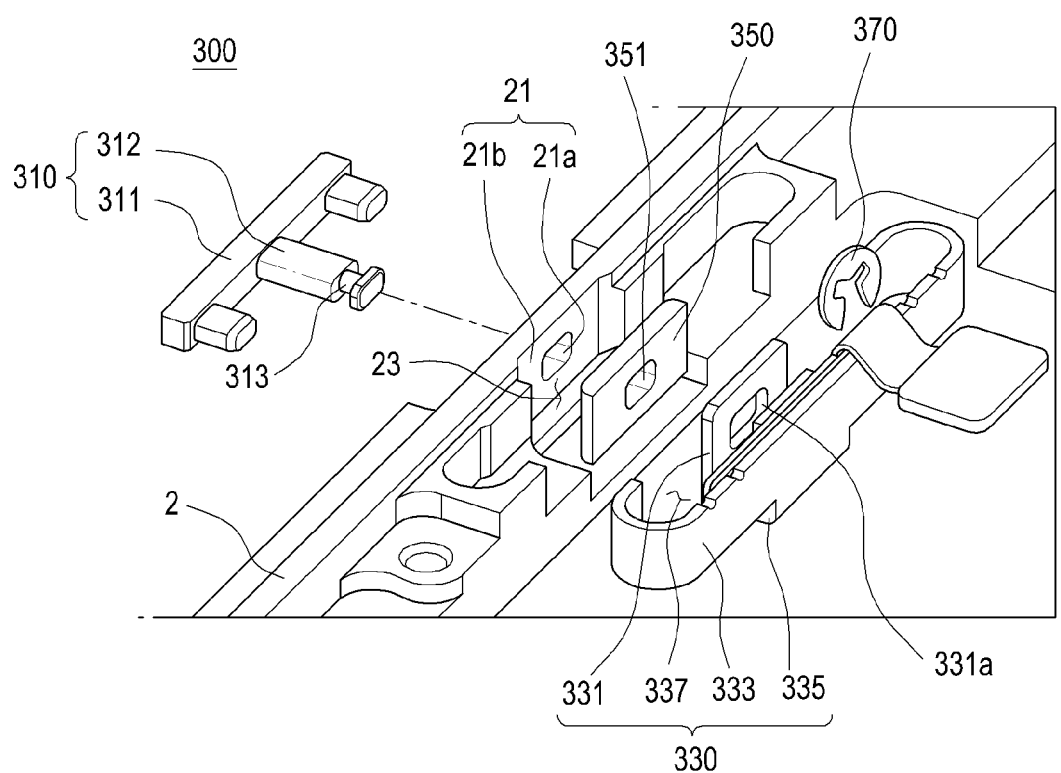
FIG. 4 is an exploded perspective view illustrating the components of a key module, before assembly, according to an embodiment of the present disclosure.

FIG. 4 is an exploded perspective view illustrating the components of a key module, before assembly, according to various embodiments of the present disclosure.

As illustrated in FIGS. 1 to 4, the electronic device 10 of the present disclosure may include a front cover 10a, a rear cover 10b, a bezel 2, a display device 160, and a key module 300.

The front cover 10a may form the front face of the electronic device 10, and the rear cover 10b may form the rear face of the electronic device 10. In addition, the bezel 2 may surround at least a portion of a space 23 formed between the front cover 10a and the rear cover 10b, and may include a first portion 21 including an opening 21a. The display device 160 may be disposed within the space 23 formed between the front cover 10a and the rear cover 10b, and may be configured to include a screen area exposed through the front cover 10a.

Because various devices disposed on the front cover 10a and the rear cover 10b have been described above, detailed descriptions thereof will be omitted.

Figure 5:
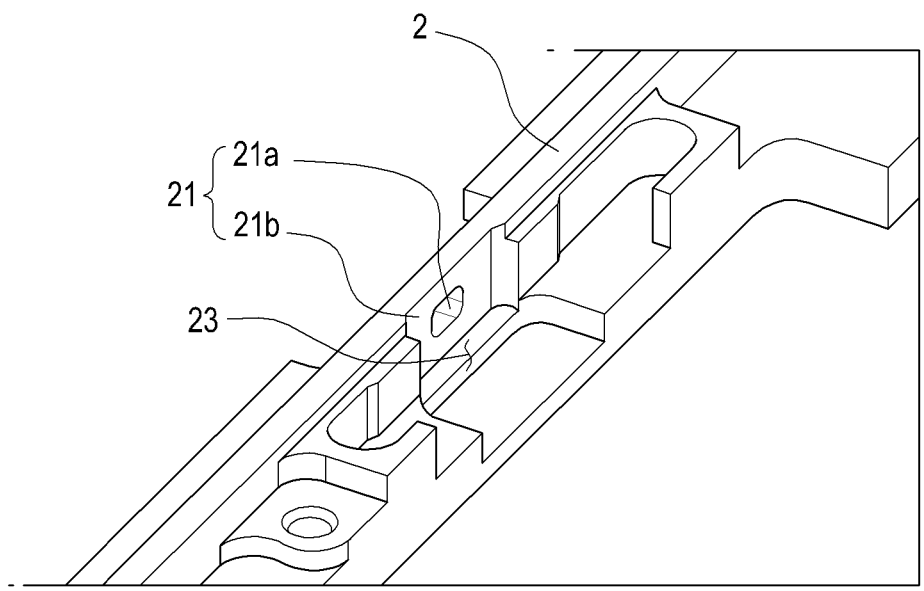
FIG. 5 is a perspective view illustrating an electronic device that is provided with a bezel including an opening, according to an embodiment of the present disclosure.

FIG. 5 is a perspective view illustrating an electronic device that is provided with a bezel including an opening, according to various embodiments of the present disclosure.

Referring to FIGS. 1 to 5, the bezel 2 may be disposed to form the side face (i.e., the rim) of the electronic device 10. For example, the bezel 2 may be disposed to surround at least a portion of the space formed between the front cover 10a and the rear cover 10b.

The bezel 2 may include a first portion 21 that includes an opening 21a to allow at least a portion of the key 310 to be inserted into the space 23. On the inner face where the first portion 21 faces the space 23, the bezel 2 may include a seating recess 21b in which the first member 350 is seated. The seating recess 21b may have a shape corresponding to a seating face of the first member 350 such that the first member 350 is seated in, and fixed to, the seating recess 21b.

<First Embodiment>

Referring to FIG. 4 again, according to various embodiments of the present disclosure, the key module 300 may be disposed on a side face of the electronic device 10, and may include a key 310, a plate 330, first member 350, and a second member 370.

The key module 300 may be disposed on the side face of the electronic device 10 such that the user may input data information and may deliver an electric signal to the inside of the electronic device 10 in order to acquire desired information.

The key 310 may be disposed to have a size and shape to pass through the space 23 formed between the front cover 10a and the rear cover 10b through the opening 21a of the bezel 2. For example, the key 310 may include a key button 311 disposed on the bezel 2, and a rod 312 connected to the key button 311 and configured to be movable in a first direction in the formed space 23.

The key button 311 is disposed on the side face of the electronic device 10 to allow the user to easily click in the state of gripping the electronic device 10.

The rod 312 is disposed to be perpendicular to the longitudinal direction of the key button 311 to be inserted into the electronic device 10, and may move along the insertion direction (e.g., the first direction). There may be provided one or more rods 312, and a step 313 may be formed on the outer surface of each rod 312 in order to prevent the separation of the rod 312 inserted into the plate 330.

For example, in an embodiment of the present disclosure, the step 313 formed on the outer surface of the rod 312 may be formed in a ring shape, and the step 313 of the rod 312 may be inserted into an accommodation hole 331a of a first protrusion 331 after moving in the first direction through the pathway. Accordingly, a second member 370 may be additionally coupled in order to prevent the separation of the rod 312 when the step 313 of the rod 312 is inserted into the accommodation hole 331a.

Figure 6:
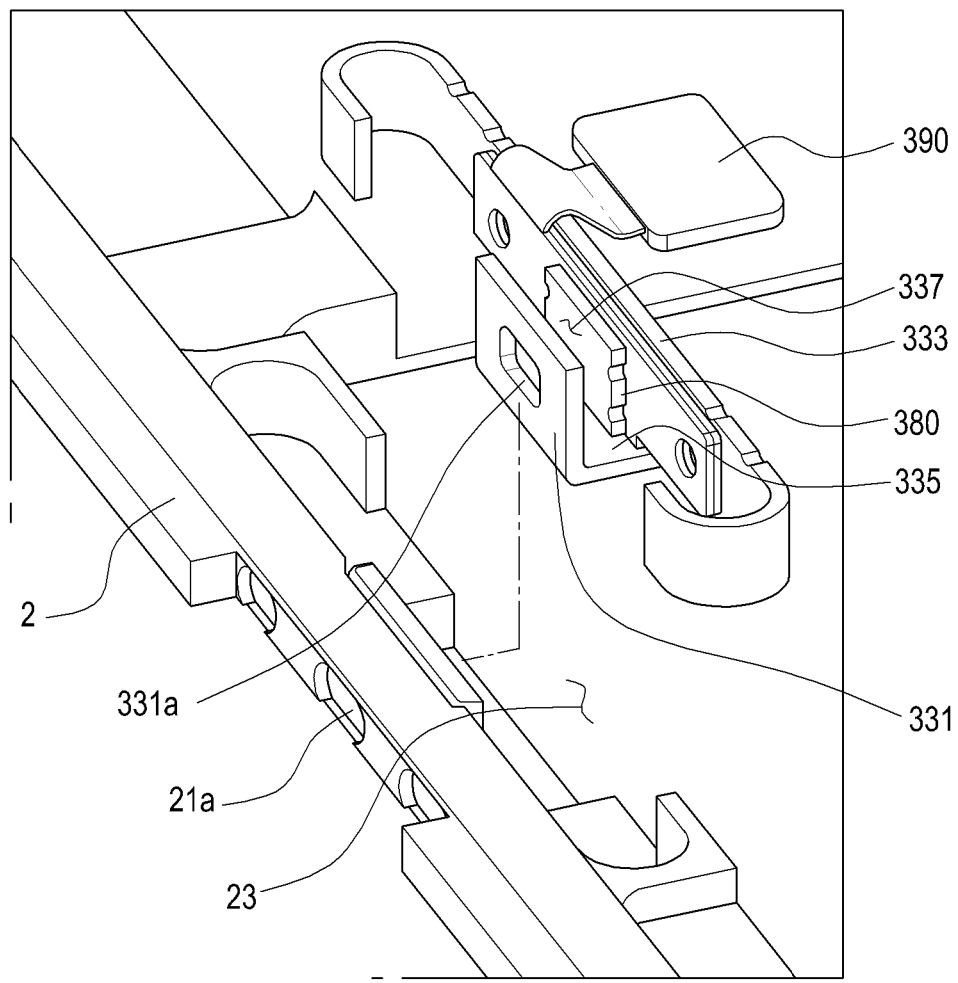
FIG. 6 is a perspective view illustrating the components of the key module, before a plate is in the assembled state, according to an embodiment of the present disclosure.

FIG. 6 is a perspective view illustrating the components of the key module, before the plate is in the assembled state, according to various embodiment of the present disclosure.

Referring to FIG. 6, the plate 330 may include first and second protrusions 331 and 333 that are disposed to be adjacent to the opening 21a of the bezel 2 within the space 23 formed between the front cover 10a and the rear cover 10b, and are spaced apart from each other. In addition, the plate 330 may include a support flat surface 335 that is parallel to the rear cover 10b within the space formed between the front cover 10a and the rear cover 10b.

The support flat surface 335 may interconnect the first and second protrusions 331 and 333, and at the same time, may support the first and second protrusions 331 and 333. Accordingly, the configuration of the entire plate 330 including the first and second protrusions 331 and 333 that are disposed perpendicular to the support flat surface 335 and are parallel to each other may be formed in a "⊏" shape such that a second direction, which is different from the first direction, is opened.

Between the first and second protrusions 331 and 333, a space is provided in which the rod 312 is movable in the first direction, and an accommodation space 337 is formed in which a dome button unit 380 and a flexible print circuit board 390 are disposed, to allow respective components to be mounted therein, thereby forming an integral bracket structure.

The first and second protrusions 331 and 333 may not be in contact with the first portion 21 to provide a pathway leading to the opening 21a.

For example, the first protrusion 331 may be formed to have a length that is equal to or smaller than that of the second protrusion 333, and may include an accommodation recess 331a in which at least a portion of the rod 312 may be accommodated. One face of the first protrusion 331 is disposed to be in contact with the first member 350 disposed in the seating recess 21b of the bezel 2, and the other face of the first protrusion 331 may form one face of the accommodation space 337. The center of the accommodation recess 331a of the first protrusion 331 and the center of the opening 21a of the bezel 2 may be positioned on the same line.

The second protrusion 333 is disposed in parallel to, and spaced away from, the first protrusion 331, and may serve as a support member on which various components may be mounted and supported. From the face forming the accommodation space 337 of the second protrusion 333 toward the outside, the flexible printed circuit board 390, the dome button unit 380, and the end of the rod 312 may be stacked in sequence. For example, the rod 312 and the dome button unit 380 may be positioned to come in contact with each other such that the end of the rod 312 may apply pressure to the dome button unit 380 while moving in the first direction.

Figure 7:
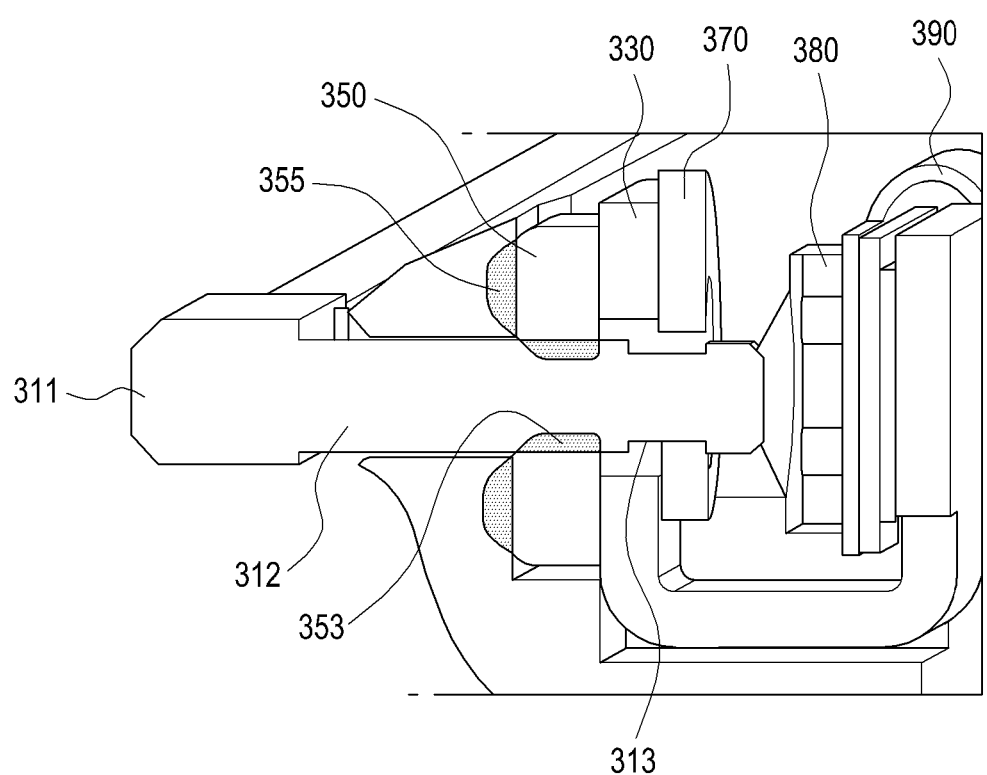
FIG. 7 is a perspective view illustrating an assembled state of a first member among the components of the key module according to an embodiment of the present disclosure.

FIG. 7 is a perspective view illustrating an assembled state of the first member among the components of the key module according to various embodiments of the present disclosure.

Referring to FIGS. 4 to 7, the first member 350 may be disposed between the inner face of the bezel 2 and the first protrusion 331, and between the inner face of the bezel 2 and the second protrusion 333, and may serve to hermetically seal the space 23 formed between the front cover 10a and the rear cover 10b, from the outside of the electronic device 10.

The first member 350 may include a via hole 351 through which at least a portion of the key 310 is inserted. When the rod 312 of the key 310 is inserted into the inner space 23 through the via hole 351, the first member 350, which is formed to elastically enclose the periphery of the rod 312, may block foreign matter, such as fluid infiltrating into the inside of the electronic device 10. The first member 350 is formed of an elastic material, and as the key 310 moves through the via hole 351, the first member 350 may be compressed or tensioned.

Points to block the foreign matter, such as fluid, may be configured as a first waterproof contact face 353 and a second waterproof contact face 355.

The first waterproof contact face 353 may be formed as the first member 350 comes in elastic contact with the key 310 on the first direction where the key 310 moves. For example, when the rod 312 is inserted into the via hole 351 of the first member 350 seated in the seating recess 21b of the bezel 2 and moves in the first direction, one face of the first member 350, which is in contact with the rod 312 and the via hole 351, may be compressed. Accordingly, the compressed first member 350 may overlap with the rod 312 to form the first waterproof contact face 353, thereby blocking fluid or the like that infiltrates from the outside.

The second waterproof contact face 355 may be formed as the key 310 comes in elastic contact with the key 310 on the second direction that is different from the first direction. For example, as the first member 350 is seated in the seating recess 21b of the bezel 2, the movement of the rod 312 in the first direction may cause one face of the first member 350, which is in contact with the seating recess 21b to be tensioned. Accordingly, the tensioned first member 350 may overlap with the seating recess 21b to form the second waterproof contact face 355, thereby blocking fluid or the like that infiltrates from the outside.

The one face of the first member 350 and the peripheral portion of the via hole 351 may be formed with a circular or oval protrusion (not illustrated), and may be disposed to be abutted and seated in the seating recess 21b. The other face of the first member 350 may be disposed to be abutted on the first protrusion 331 of the plate 330. Accordingly, the first protrusion 331 of the plate 330 may come in strong close contact with the one face of the first member 350, thereby improving a seal effect. In addition, the circular or oval protrusion formed of an elastic material on the peripheral portion of the via hole 351 of the first member 350 may come in strong close contact with the periphery of the opening 21a formed in the seating recess 21b, thereby somewhat further strengthening the seal effect.

Figure 8:
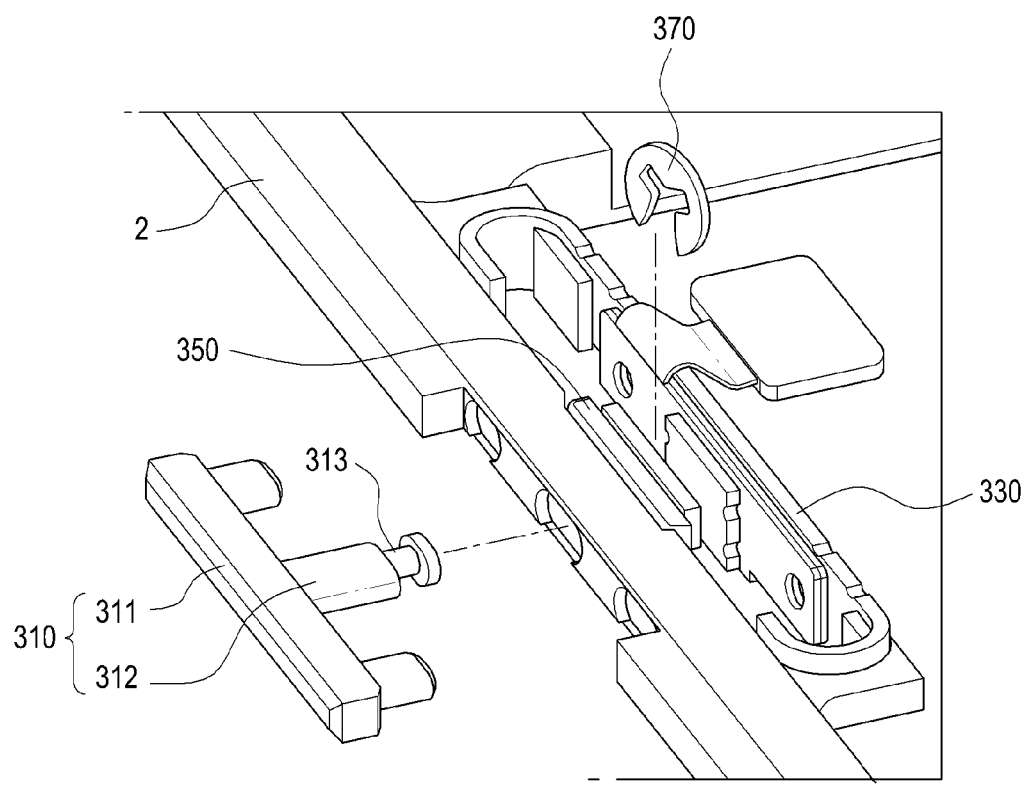
FIG. 8 is a perspective view illustrating an assembled state of a second member among the components of the key module according to an embodiment of the present disclosure.

FIG. 8 is a perspective view illustrating an assembled state of a second member among the components of the key module according to various embodiments of the present disclosure.

As illustrated in FIGS. 4 and 8, after the first member 350 and the plate 330 are disposed on the space 23 and the key 310 is inserted from the outside, the second member 370 may be disposed to be coupled in a second direction that is different from the first direction.

The second member 370 may be made in the shape of a generally used E-ring, and may be implemented in a size and shape that are capable of preventing the separation of the rod 312 by being coupled to the step 313 of the rod 312. Typically, the second member 370 may be formed as a hole, one side of which is opened.

The second member 370 may be disposed to come in contact with the first protrusion 331 at the one face thereof and at the same time, to be coupled to the rod 312, thereby preventing the key 310 from being separated to the outside.

Hereinafter, descriptions will be made on the dome button unit 380 and the flexible printed circuit board 390, which are disposed within the accommodation space 337 within the plate 330.

Referring to FIGS. 4 to 8 again, the dome button unit 380 may be disposed between the first and second protrusions 331 and 333 of the plate 330.

The dome button unit 380 is configured to include an elastic material, and may deliver pressure applied from the outside to the flexible printed circuit board 390. For example, when the key 310 receives the pressure delivered in the first direction from the outside, the rod 312 delivers the pressure to the dome button unit 380 while coming in contact with the dome button unit 380, and the pressure may be delivered to the flexible printed circuit board 390 while the shape of the dome button unit 380 is partially elastically deformed. When the pressure delivered from the outside disappears, the dome button shape 380 may recover the sound dome shape again.

In order to assure that the pressure applied from outside can be correctly delivered, the centers of the opening 21a of the bezel 2, the via hole 351 of the first member 350, and the dome button unit 380 may be arranged on the same line.

The flexible printed circuit board 390 may be disposed outside the dome button unit 380 within the accommodation space 337 between the first and second protrusions 331 and 333 of the plate 330.

Here, the portion disposed outside the dome button unit 380 corresponds to a portion of the flexible printed circuit board 390, and may be disposed between the dome button unit 380 and the second protrusion 333 of the plate 330. The other portion of the flexible printed circuit board 390 may be disposed on the space 23.

The flexible printed circuit board 390 may convert the pressure delivered from the above-mentioned dome button unit 380 into an electric signal so as to make a support such that a desired function desired by the user may be performed. For example, when the key 310 receives the pressure in the first direction from the outside, the rod 312 may deliver the pressure to the dome button unit 380 while coming in contact with the dome button unit 380. Thereafter, when the shape of the dome button unit 380 is partially elastically deformed to deliver the pressure to the flexible printed circuit board 390, an electric signal corresponding to the pressure may be generated to be delivered to the electronic device 10 within the space.

In order to assure that the pressure applied from outside can be correctly delivered, the centers of the opening 21a of the bezel 2, the via hole 351 of the first member 350, and the dome button unit 390, the center of the printed circuit board 390 disposed on the second protrusion 333 may be arranged on the same line.

In the key module 300 provided in the electronic device 10 according to one embodiment of the present disclosure, components serving as a washer, a spring, etc. may be integrally made and disposed in a module so that the number of components can be reduced compared to the conventional configuration, and a limitation of a mounting space can be solved to reduce the cost of components and to slim the electronic device. In addition, a point forming a waterproof contact face is implemented along an integral key module structure such that a waterproof function can be realized with a simple structure.

<Second Embodiment>

Figure 9:
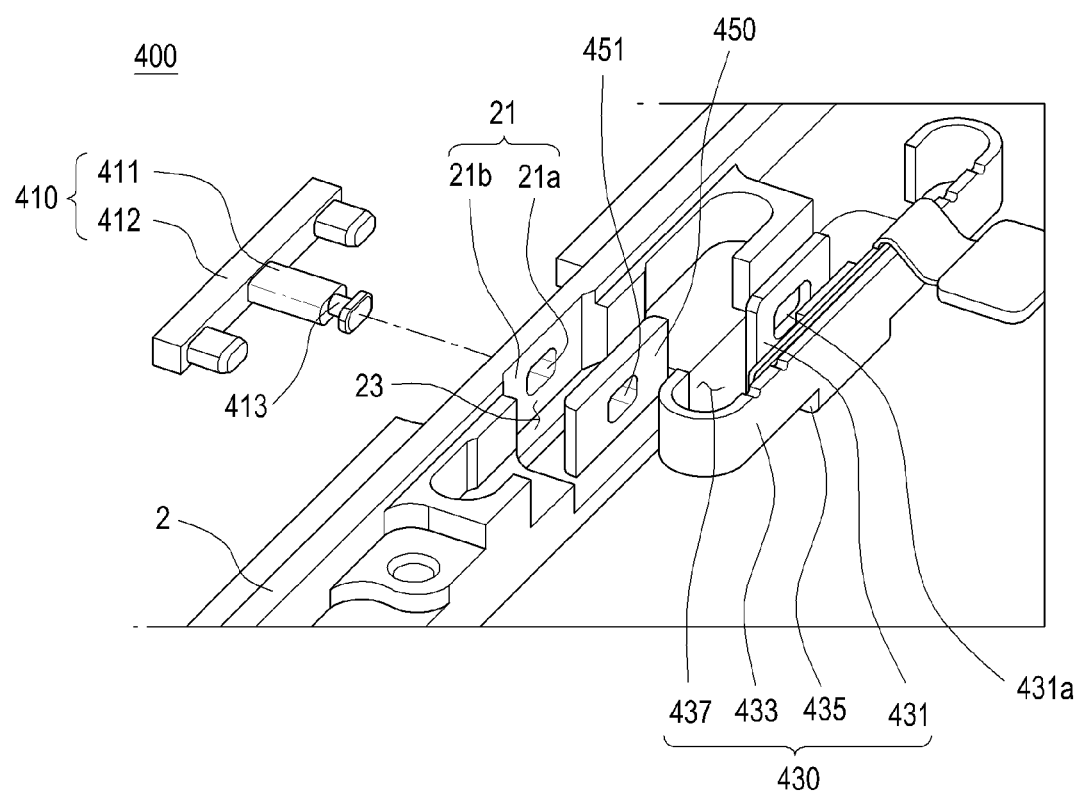
FIG. 9 is an exploded perspective view illustrating the components of the key module, before assembly, according to another embodiment of the present disclosure.

FIG. 9 is an exploded perspective view illustrating the components of a key module, before assembly, according to various embodiments of the present disclosure.

Referring to FIG. 9 again, according to various embodiments of the present disclosure, the key module 400 may be disposed on a side face of the electronic device 10, and may include a key 410, a plate 430, and a first member 450.

The key module 400 may be disposed on the side face of the electronic device 10 such that the user may input data information and may deliver an electric signal to the inside of the electronic device 10 in order to acquire desired information.

The key 410 may be disposed to have a size and shape to pass through the space 23 formed between the front cover 10a and the rear cover 10b through the opening 21a of the bezel 2. For example, the key 410 may include a key button 411 disposed on the bezel 2, and a rod 412 connected to the key button 411 and configured to be movable in a first direction in the formed space 23.

The key button 411 is disposed in the longitudinal direction of the bezel 2 on the side face of the electronic device 10 to allow the user to easily click in the state of gripping the electronic device 10.

The rod 412 is disposed to be perpendicular to the longitudinal direction of the key button 411 to be inserted into the electronic device 10, and may move along the insertion direction (e.g., the first direction). There may be provided one or more rods 412, and a step 413 may be formed on the outer surface of each rod 412 in order to prevent the separation of the rod 412 inserted into the plate 430.

For example, in an embodiment of the present disclosure, the step 413 formed on the outer surface of the rod 412 may be formed in a ring shape, and the step 413 of the rod 412 may be inserted into an accommodation hole 431a of a first protrusion 431 after moving in the first direction through the pathway.

Figure 10:
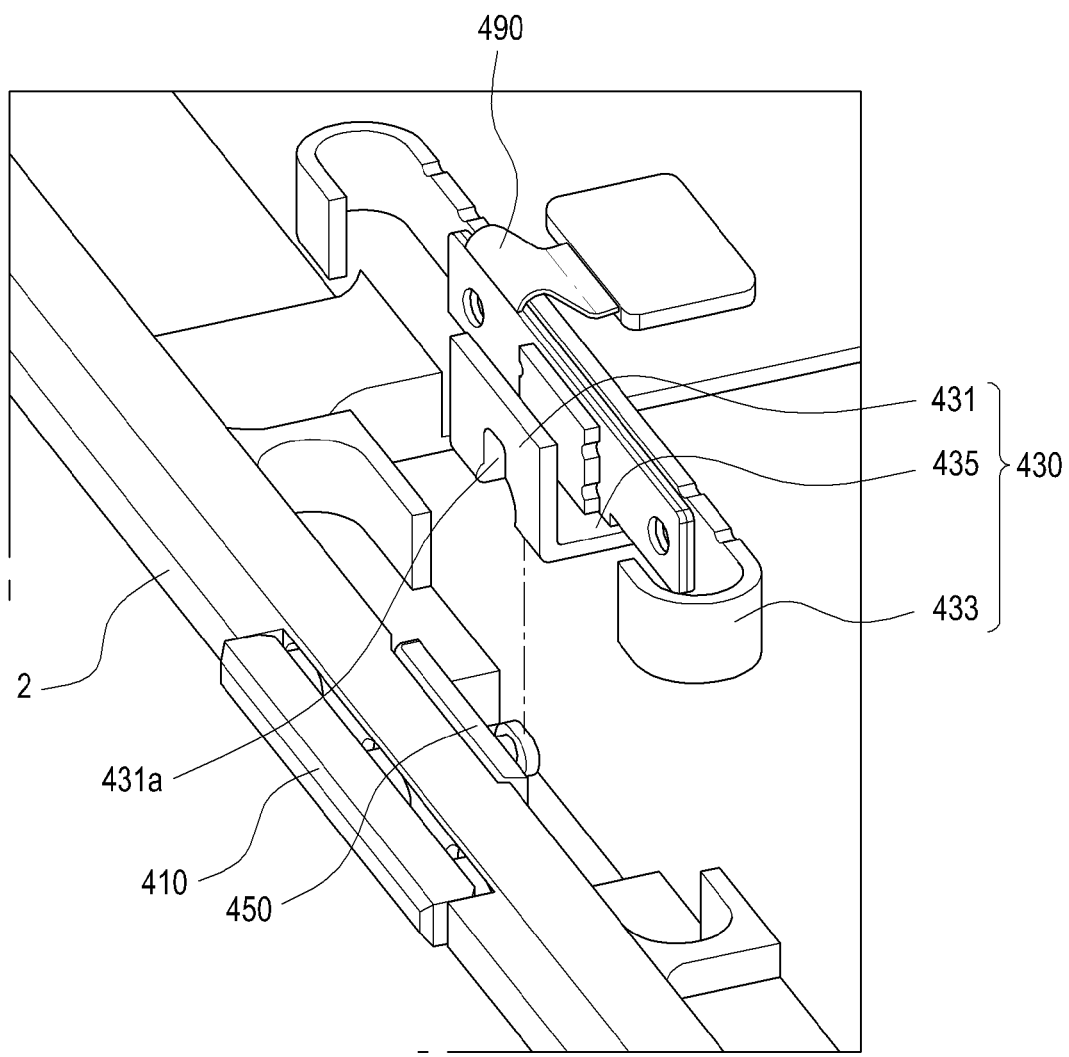
FIGS. 10 and 11 are a perspective view and a sectional view illustrating the components of the key module, before and after a plate is in the assembled state, according to another embodiment of the present disclosure.
Figure 11:
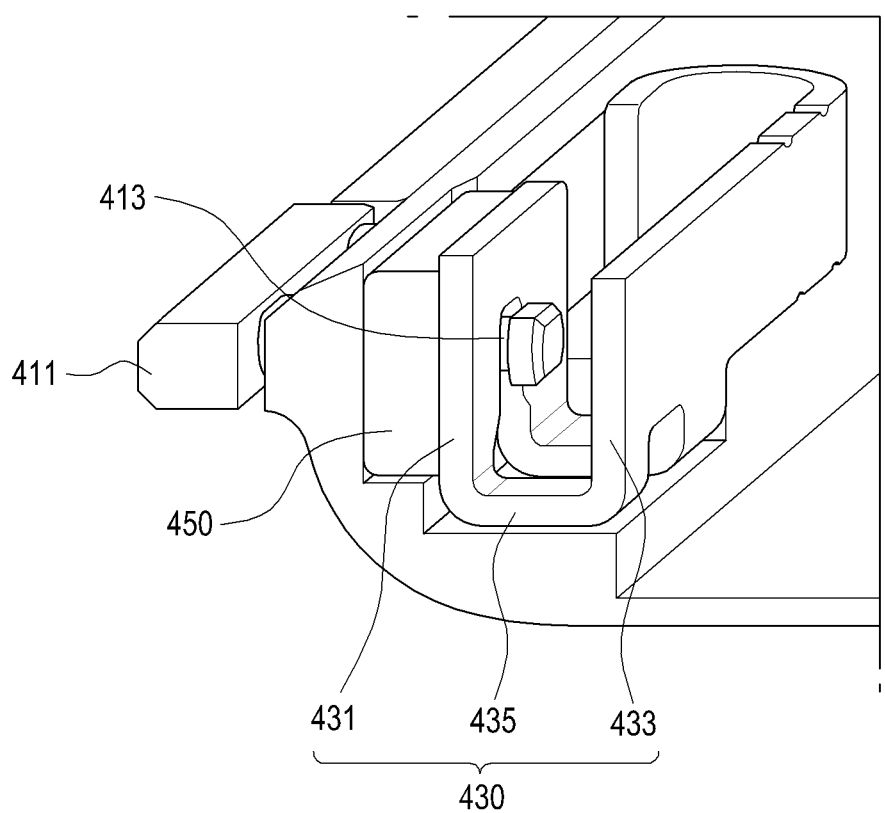

FIGS. 10 and 11 are a perspective view and a sectional view illustrating the components of the key module, before and after a plate is in the assembled state, according to various embodiments of the present disclosure.

Referring to FIGS. 10 and 11, the plate 430 may include first and second protrusions 431 and 433 that are disposed to be adjacent to the opening 21a of the bezel 2 within the space 23 formed between the front cover 10a and the rear cover 10b, and are spaced apart from each other. In addition, the plate 330 may include a support flat surface 435 that is parallel to the rear cover 10b within the space formed between the front cover 10a and the rear cover 10b.

The support flat surface 435 may interconnect the first and second protrusions 431 and 433, and at the same time, may support the first and second protrusions 431 and 433. Accordingly, the configuration of the entire plate 430 including the first and second protrusions 431 and 433 that are disposed perpendicular to the support flat surface 435 and are parallel to each other may be formed in a "⊏" shape such that a second direction, which is different from the first direction, is opened.

Between the first and second protrusions 431 and 433, a space is provided in which the rod 412 is movable in the first direction, and an accommodation space 437 is formed in which a dome button unit 480 and a flexible print circuit board 490 are disposed, so as to allow respective components to be mounted therein, thereby forming an integral bracket structure.

The first and second protrusions 431 and 433 may not be in contact with the first portion 21 to provide a pathway leading to the opening 21a.

For example, the first protrusion 431 may be formed to have a length that is equal to or smaller than that of the second protrusion 433, and may include an accommodation hole 431a in which at least a portion of the rod 412 of the key 410 may be accommodated. One face of the first protrusion 431 is disposed to be in contact with the first member 450 seated in the seating recess 21b of the bezel 2, and the other face of the first protrusion 431 may form one face of the accommodation space 437.

The accommodation hole 431a formed in the first protrusion 431 may be opened on one face that faces in the second direction that is different from the first direction, to be coupled in the second direction with the rod 412 inserted in the first direction. The accommodation hole 431a may have a ⊏ shape that is disposed on the first protrusion 431, the support flat surface 435, and the second protrusion 433 and is opened at the upper side.

Unlike the above-described first embodiment, in the present embodiment, when the first protrusion 431 of the plate 430 and the rod 412 of the key 410 are coupled to each other, they are not coupled in one direction (in the first direction), but are coupled in two directions (in the first direction and the second direction perpendicular to the first direction). For example, the plate 430 may be manufactured such that the opened accommodation hole 431a is fixedly coupled by being engaged to the step 413 of the rod 412 inserted in the first direction. Accordingly, unlike the above-described first embodiment, the separation of the movable rod 412 can be reduced or prevented without using the second member 370 such that the same or a greater effect can be achieved with a relatively simple structure. In addition, due to the non-existence of the second member 370, it is possible to additionally obtain the effects of reducing a manufacturing cost and shortening a manufacturing time according to the simplification of the structure.

The second protrusion 433 is disposed in parallel to, and spaced away from, the first protrusion 431, and may serve as a support member on which various components may be mounted and supported. From the face forming the accommodation space 437 of the second protrusion 433 toward the outside, the flexible printed circuit board 490, the dome button unit 480, and the end of the rod 412 may be stacked in sequence. For example, the rod 412 and the dome button unit 480 may be positioned to come in contact with each other such that the end of the rod 412 may apply pressure to the dome button unit 480 while moving in the first direction.

Figure 12:
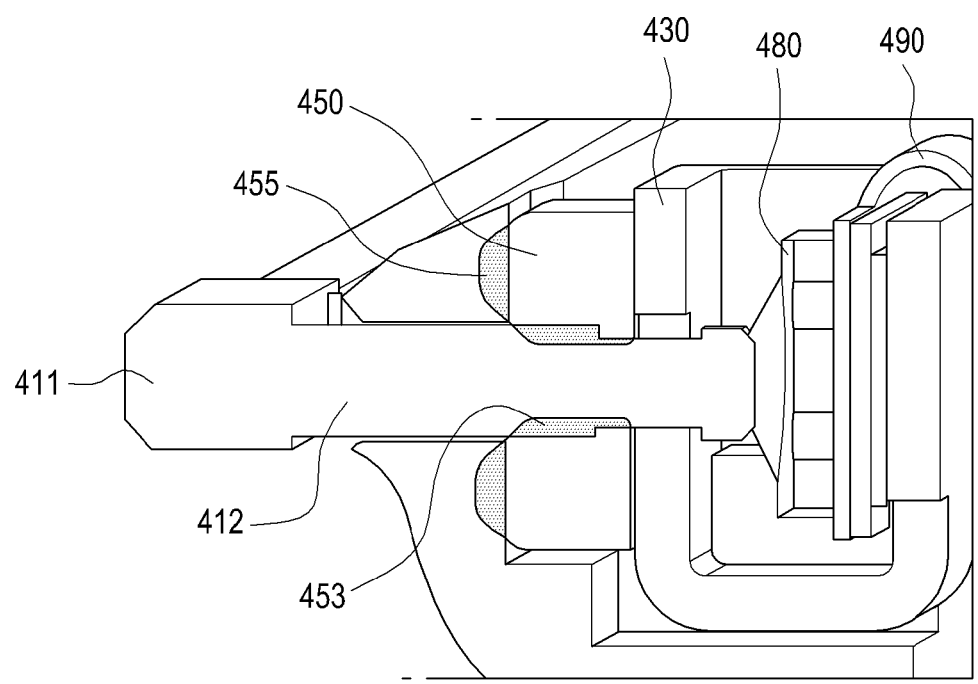
FIG. 12 is a sectional view illustrating an assembled state of a first member among the components of the key module according to another embodiment of the present disclosure.

FIG. 12 is a sectional view illustrating an assembled state of a first member among the components of the key module according to various embodiments of the present disclosure.

Referring to FIG. 12, the first member 450 may be disposed between the inner face of the bezel 2 and the first protrusion 431, and between the inner face of the bezel 2 and the second protrusion 433, and may serve to hermetically seal the space 23 formed between the front cover 10a and the rear cover 10b, from the outside of the electronic device 10.

The first member 450 may include a via hole 451 through which at least a portion of the key 410 is inserted. For example, when the rod 412 of the key 410 is inserted into the inner space 32 through the via hole 451, the first member 450, which is formed to elastically enclose the periphery of the rod 412, may block foreign matter, such as fluid infiltrating into the inside of the electronic device 10. The first member 450 is formed of an elastic material, and as the key 410 moves through the via hole 451, the first member 450 may be compressed or tensioned.

Points to block the foreign matter, such as fluid, may be configured as a first waterproof contact face 453 and a second waterproof contact face 455.

The first waterproof contact face 453 may be formed as the key 410 comes in elastic contact with the key 410 on the first direction where the key 310 moves. For example, when the rod 412 is inserted into the via hole 451 of the first member 450 seated in the seating recess 21b of the bezel 2 and moves in the first direction, one face of the first member 450, which is in contact with the rod 412 and the via hole 451, may be compressed. Accordingly, the compressed first member 450 may overlap with the rod 412 to form the first waterproof contact face 453, thereby blocking fluid or the like that infiltrates from the outside.

The second waterproof contact face 455 may be formed as the key 410 comes in elastic contact with the key 410 on the second direction that is different from the first direction. For example, as the first member 450 is seated in the seating recess 21b of the bezel 2, the movement of the rod 412 in the first direction may cause one face of the first member 450, which is in contact with the seating recess 21b, to be tensioned. Accordingly, the tensioned first member 450 may overlap with the seating recess 21b to form the second waterproof contact face 455, thereby blocking fluid or the like that infiltrates from the outside.

The one face of the first member 450 and the peripheral portion of the via hole 451 may be formed with a circular or oval protrusion (not illustrated), and may be disposed to be abutted and seated in the seating recess 21b. The other face of the first member 450 may be disposed to be abutted on the first protrusion 431 of the plate 430. Accordingly, the first protrusion 431 of the plate 430 may come in strong close contact with the one face of the first member 450, thereby improving a seal effect. In addition, the circular or oval protrusion formed of an elastic material on the peripheral portion of the via hole 451 of the first member 450 may come in strong close contact with the periphery of the opening 21*a* formed in the seating recess 21*b*, thereby somewhat further strengthening the seal effect.

The configurations of the dome button unit 480 and the flexible printed circuit board 490 are the same as those of the first embodiment, detailed descriptions thereof will be omitted.

In the key module 400 provided in the electronic device 10 according to one embodiment of the present disclosure, components serving as a washer, a spring, an E-ring, etc. may be integrally made and disposed in a module so that the number of components can be reduced compared to the conventional configuration, and a limitation of a mounting space can be solved to reduce the cost of components and to slim the electronic device. In addition, a point forming a waterproof contact face is implemented along an integral key module structure such that a waterproof effect can be realized with a simple structure.

<Third Embodiment>

Figure 13:
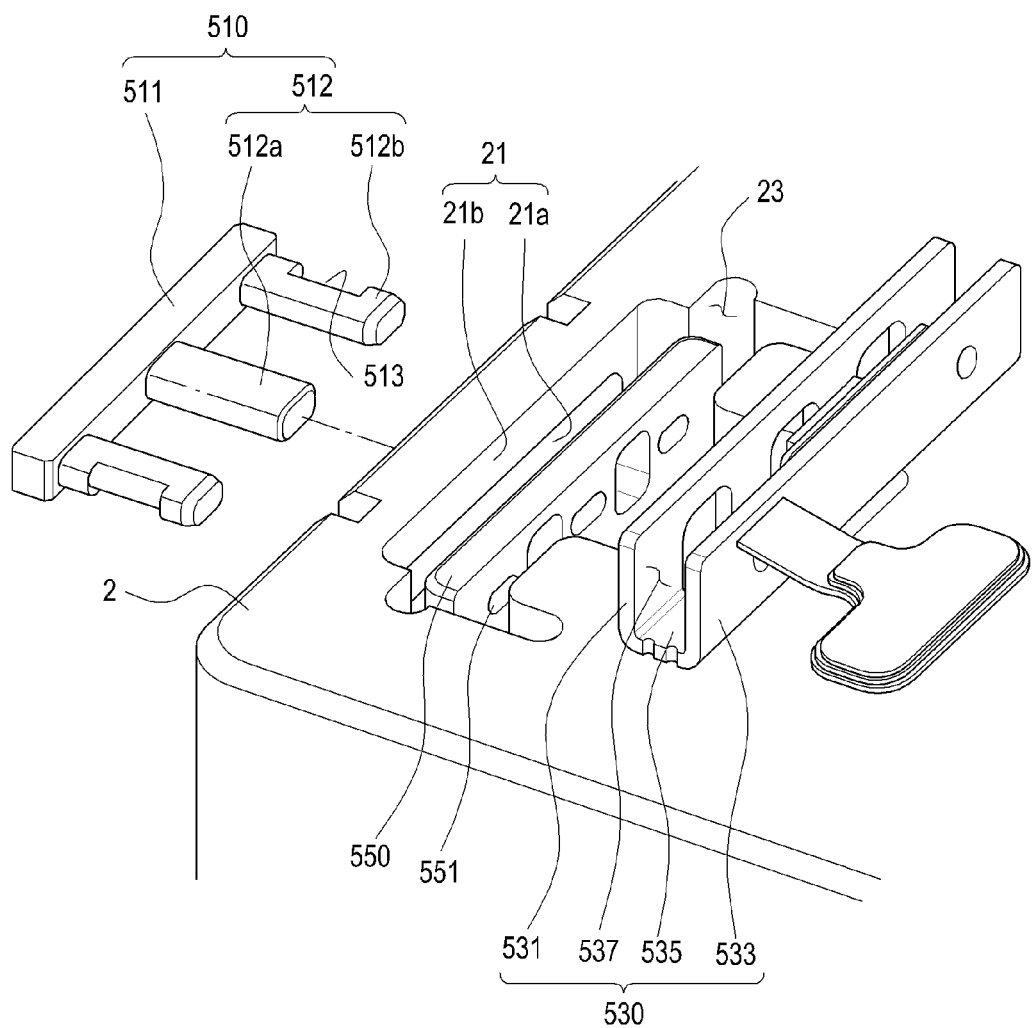
FIG. 13 is an exploded perspective view illustrating the components of the key module, before assembly, according to still another embodiment of the present disclosure.

FIG. 13 is an exploded perspective view illustrating the components of a key module, before assembly, according to various embodiments of the present disclosure.

Referring to FIGS. 1 and 13, according to various embodiments of the present disclosure, the key module 500 may be disposed on a side face of the electronic device 10, and may include a key 510, a plate 530, and a first member 550.

The key module 500 may be disposed on the side face of the electronic device 10 such that the user may input data information and may deliver an electric signal to the inside of the electronic device 10 in order to acquire desired information.

The key 510 may be disposed to have a size and shape to pass through the space formed between the front cover 10*a* and the rear cover 10*b* through the opening 21*a* of the bezel 2. For example, the key 510 may include a key button 511 disposed on the bezel 2, and a plurality of rods 512 disposed on and connected to the key button 511 and configured to be movable in a first direction in the formed space 23.

The key button 511 is disposed in the longitudinal direction of the bezel 2 on the side face of the electronic device 10 to allow the user to easily click in the state of gripping the electronic device 10.

The rods 512 may be disposed to be perpendicular to the longitudinal direction of the key button to be inserted into the electronic device 10, and may move along the insertion direction (e.g., the first direction). The rods 512 may include a first rod 512*a* disposed at the center of the key button 511 and second rods 512*b* disposed to be spaced apart from, and in parallel to each other with reference to the first rod 512*a* as a center.

There may be provided two or more rods 512*b*, and a step 513 may be formed on the outer surface of each of the second rods 512*b* in order to reduce or prevent the separation of the second rods 512*b* inserted into the plate 530.

For example, in an embodiment of the present disclosure, the step 513 formed on the outer surface of each of the second rods 512*b* may be formed in a shape facing the outside of the key 510, and the step 513 of each of the second rods 512*b* may be inserted into an accommodation hole 531*a* of a first protrusion 531 after moving in the first direction through the pathway.

Figure 14:
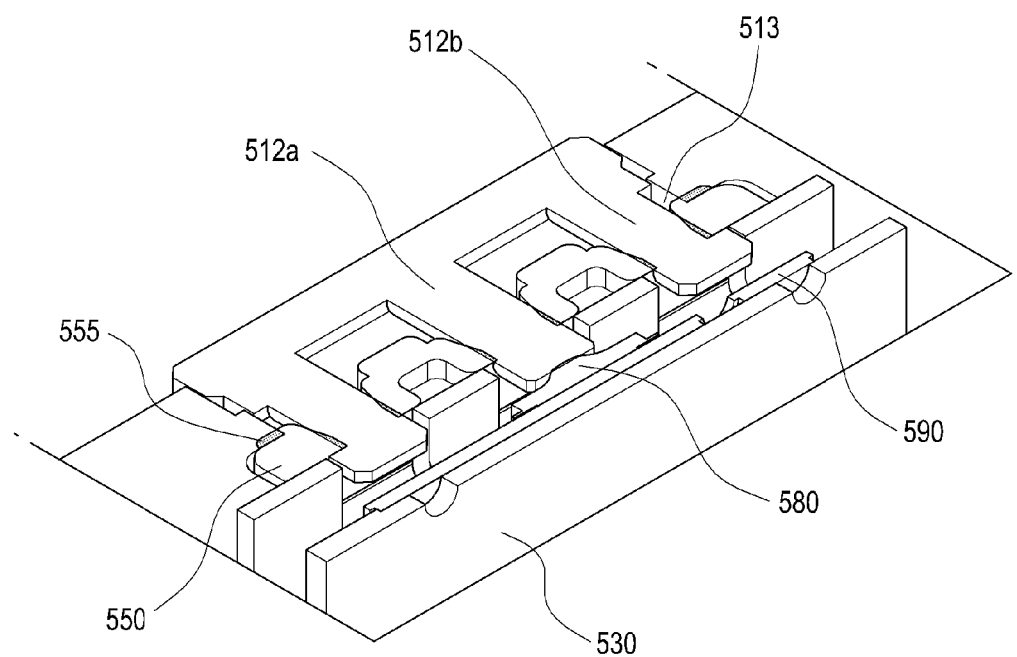
FIGS. 14 and 15 are a sectional view and a perspective view illustrating the components of the key module, before and after a plate is in the assembled state, according to still another embodiment of the present disclosure.
Figure 15:
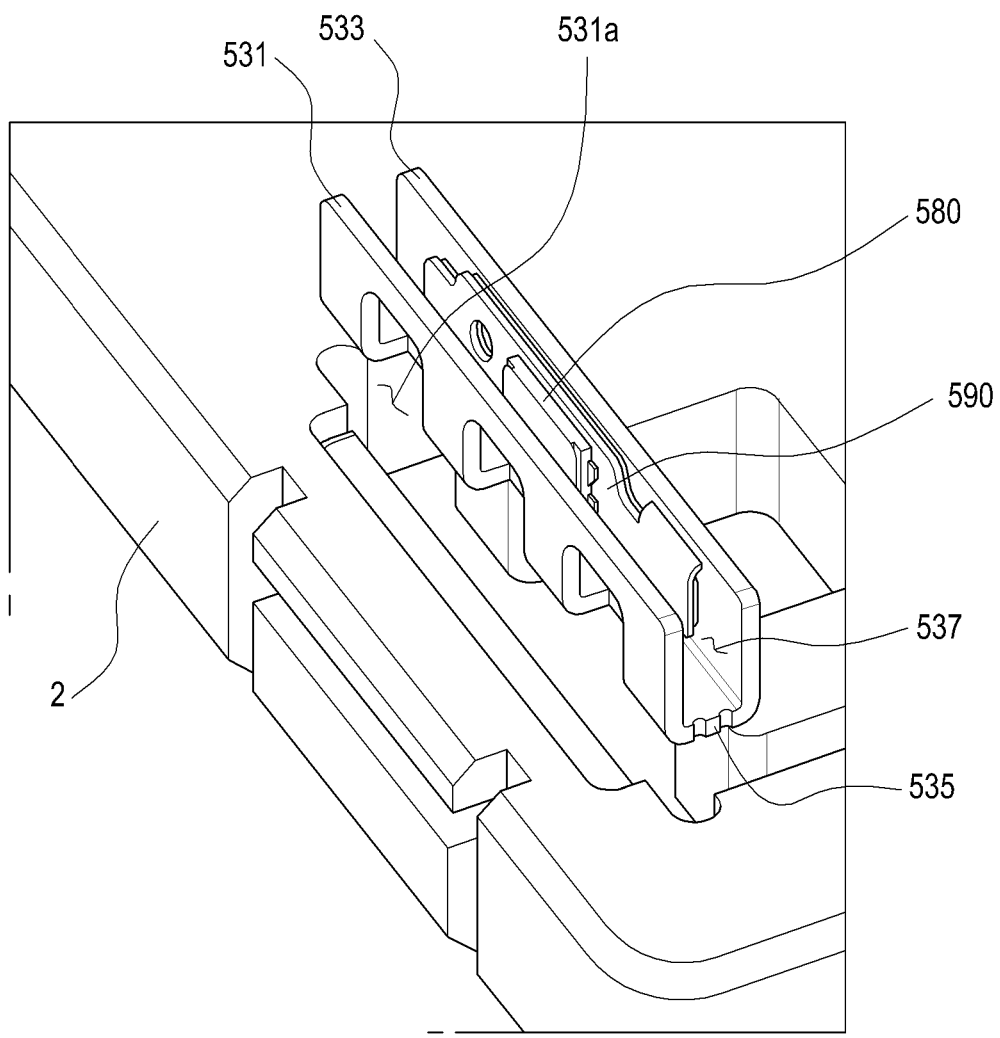

FIGS. 14 and 15 are a sectional view and a perspective view illustrating the components of the key module, before and after a plate is in the assembled state, according to various embodiments of the present disclosure.

Referring to FIGS. 14 and 15, the plate 530 may include first and second protrusions 531 and 533 that are disposed to be adjacent to the opening 21*a* of the bezel 2 within the space 23 formed between the front cover 10*a* and the rear cover 10*b*, and are spaced apart from each other. In addition, the plate 530 may include a support flat surface 535 that is parallel to the rear cover 10*b* within the space formed between the front cover 10*a* and the rear cover 10*b*.

The support flat surface 535 may interconnect the first and second protrusions 531 and 533, and at the same time, may support the first and second protrusions 531 and 533. Accordingly, the configuration of the entire plate 530 including the first and second protrusions 531 and 533 that are disposed perpendicular to the support flat surface 535 and are parallel to each other may be formed in a "⌐" shape such that a second direction, which is different from the first direction, is opened.

Between the first and second protrusions 531 and 533, a space is provided in which the rod 512 is movable in the first direction, and an accommodation space 537 is formed in which a dome button unit 580 and a flexible print circuit board 590 are disposed, so as to allow respective components to be mounted therein, thereby forming an integral bracket structure.

The first and second protrusions 531 and 533 may not be in contact with the first portion 21 to provide a pathway leading to the opening 21*a*.

For example, the first protrusion 531 may be formed to have a length that is the same as that of the second protrusion 533, and may include accommodation holes 531*a* in which the rods 512 of the key 510 may be at least partially accommodated. One face of the first protrusion 531 is disposed to be in contact with the first member 550 seated in the seating recess 21*b* of the bezel 2, and the other face of the first protrusion 531 may form one face of the accommodation space 537.

A plurality of accommodation holes 531*a* formed in the first protrusion 531 may be formed to correspond to the plurality of rods 512 such that the plurality of rods 512 can be inserted into the accommodation holes 513*a*, respectively. In addition, a face that faces in the second direction, which is different from the first direction, may be opened to be coupled in the second direction with the rod 512 inserted in the first direction. The accommodation holes 531*a* may have a ⌐ shape that is disposed on the first protrusion 531, the support flat surface 535, and the second protrusion 533 and is opened at the upper side.

Unlike the above-described first embodiment, in the present embodiment, when the first protrusion 531 of the plate 530 and the rod 512 of the key 510 are coupled to each other, they are not coupled in one direction (in the first direction), but are coupled in two directions (in the first direction and the second direction perpendicular to the first direction). For example, the plate 530 may be manufactured such that the opened accommodation holes 531*a* are fixedly coupled by being engaged to the steps 513 of the second rods 512*b* inserted in the first direction, respectively. Accordingly, it is possible to reduce an amount of separation or prevent the movable rod 512 from being separated to the outside without using the second member 370 such that the same or a greater effect can be achieved with a relatively simple structure. In addition, due to the non-existence of the second member 370, it is possible to obtain the effects of reducing a manufacturing cost and shortening a manufacturing time according to the simplification of the structure.

The second protrusion 533 is disposed in parallel to, and spaced away from, the first protrusion 531, and may serve as a support member on which various components may be mounted and supported. From the face forming the accommodation space 537 of the second protrusion 533 toward the outside, the flexible printed circuit board 590, the dome button unit 580, and the end of the first rod 512a may be stacked in sequence. For example, the first rod 512a and the dome button unit 580 may be positioned to come in contact with each other such that the end of the first rod 512a may apply pressure to the dome button unit 580 while moving in the first direction.

Unlike the first and second embodiments described above, the present embodiment configures the first rod 512a and the second rods 512b such that pressure applied from the outside can be soundly transferred to the dome button unit 580.

For example, according to the first and second embodiments, when pressure is applied through the center of the key button 311 or 411, the rod 312 or 412 may soundly transfer the pressure to the dome button unit 380 or 480. However, in a case where pressure is applied through an edge deviated from the center of the key button 311 or 411, the length of the rod 312 or 412 inserted and moved in the first direction may be shortened and thus, the pressure may not be soundly transferred to the dome button unit 380 or 480.

However, the present embodiment implements second rods 512b, which have a length corresponding to the first rod 512a and are provided with the step 513, at the opposite sides with reference to the first rod 512a. The engagement between the steps 513 of the second rods 512b and the accommodation holes 513a of the plate 530 can reduce an amount of separation or prevent the second rods 512b from being separated to the outside over a predetermined length. For example, even in a case where pressure is applied to an edge deviated from the center of the key button 511, it is possible to prevent or reduce the length of the first rod 512a inserted and moved in the first direction from being shortened and thus, the pressure may be soundly transferred to the dome button unit 580. Accordingly, even pressure is applied to any portion of the key button 511, it is possible for the first rod 512a to generate an effect of soundly applying the pressure to the dome button unit 580.

Figure 16:
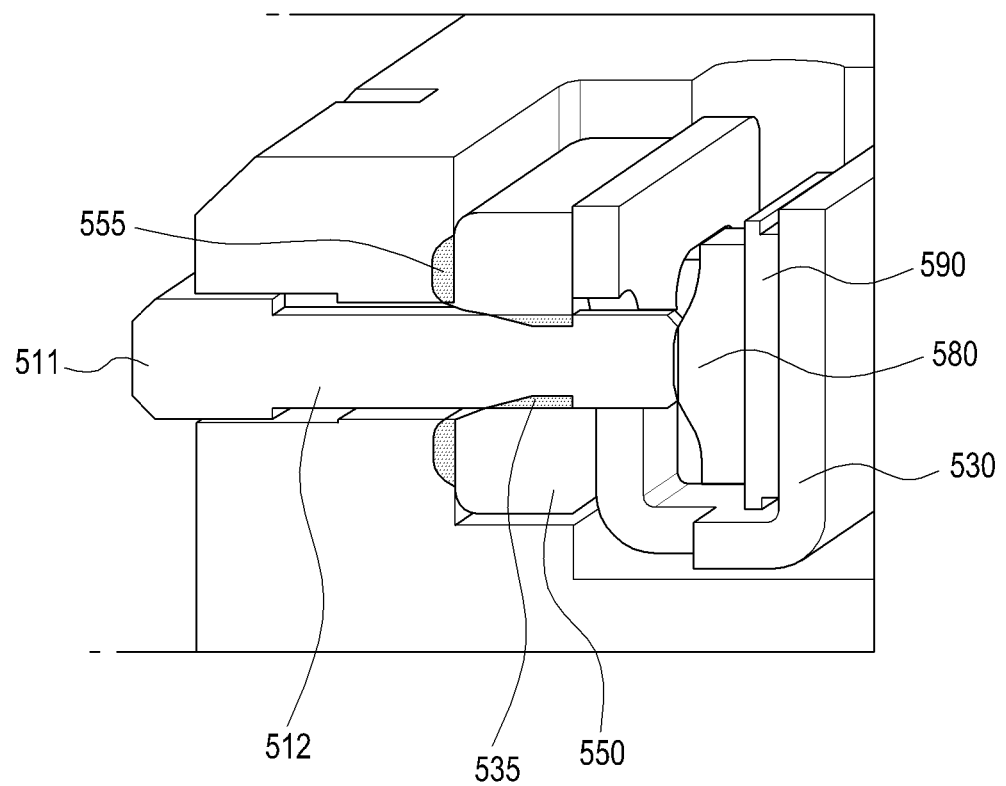
FIG. 16 is a sectional view illustrating an assembled state of a first member among the components of the key module according to still another embodiment of the present disclosure.

FIG. 16 is a sectional view illustrating an assembled state of the first member among the components of the key module according to still another embodiment of the present disclosure.

Referring to FIG. 16, the first member 550 may be disposed between the inner face of the bezel 2 and the first protrusion 531, and between the inner face of the bezel 2 and the second protrusion 533, and may serve to hermetically seal the space 23 formed between the front cover 10a and the rear cover 10b, from the outside of the electronic device 10.

The first member 550 may include a via hole 551 through which at least a portion of the key 510 is inserted. For example, a plurality of via holes 551 may be disposed at positions corresponding to a plurality of rods 512 in order to allow the plurality of rods 512 to pass through the via holes 551, respectively.

The configurations the first waterproof contact face 535 and the second waterproof contact face 555, which are the points capable of blocking the foreign matter, such as fluid, are the same as those of the above-described embodiments, and detailed descriptions thereof will be omitted.

In addition, the configurations of the dome button unit 580 and the flexible printed circuit board 590 are the same as those of the first embodiment, detailed descriptions thereof will be omitted.

In the key module 500 provided in the electronic device 10 according to one embodiment of the present disclosure, components serving as a washer, a spring, an E-ring, etc. may be integrally made and disposed in a module so that the number of components can be reduced compared to the conventional configuration, and a limitation of a mounting space can be solved to reduce the cost of components and to slim the electronic device. In addition, a point forming a waterproof contact face is implemented along an integral key module structure such that a waterproof effect can be realized with a simple structure. Further, through the engagement between the plurality of rods and the plate, it is possible to transfer pressure of a predetermined level or more to the dome button unit regardless of which portion of the key button is pushed, which enables a click for a desired data input to be smoothly made.

<Fourth Embodiment>

Figure 17:
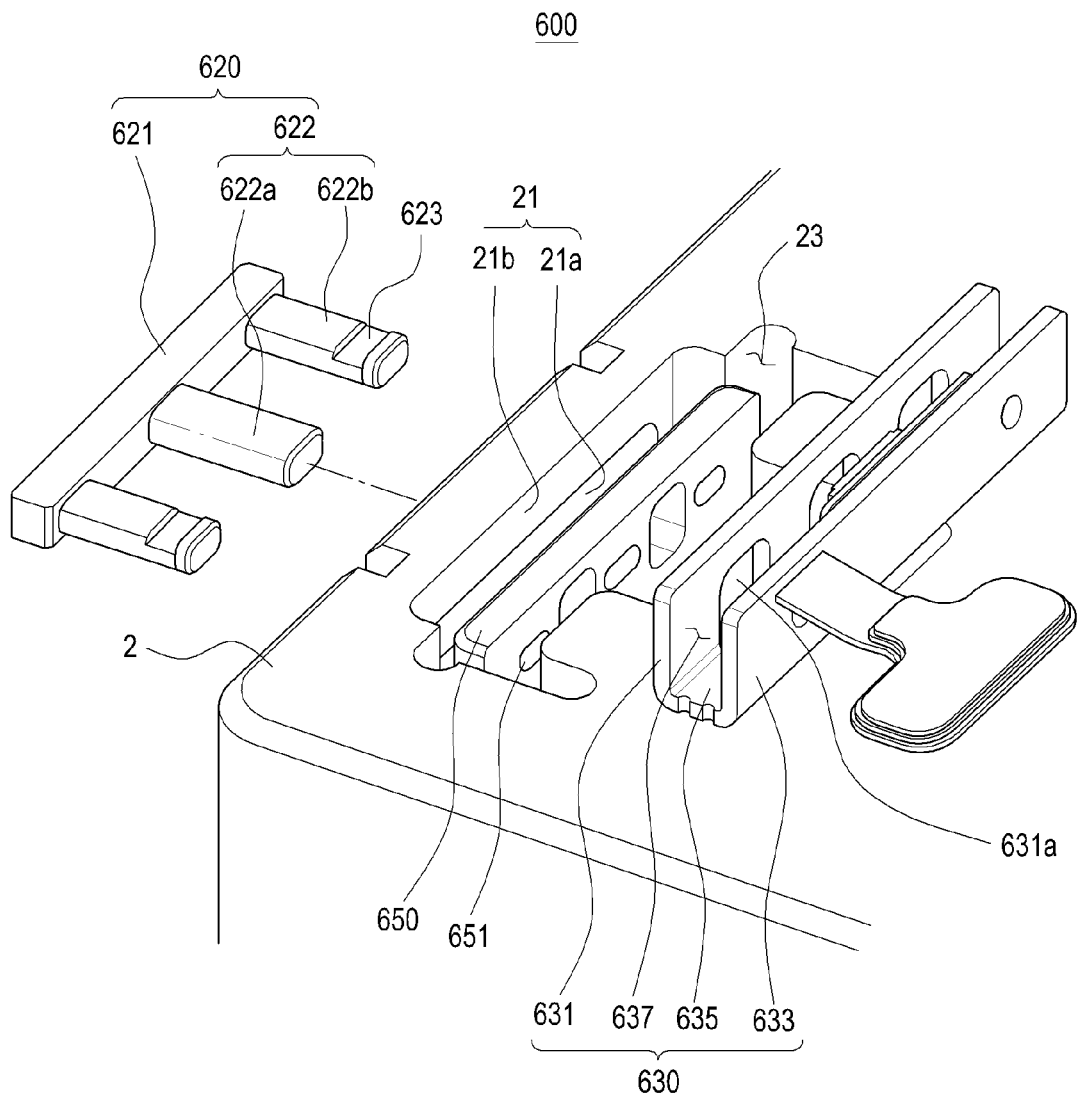
FIGS. 17 and 18 are a perspective view and a sectional view illustrating the components of the key module, before and after assembly, according to yet another embodiment of the present disclosure.
Figure 18:
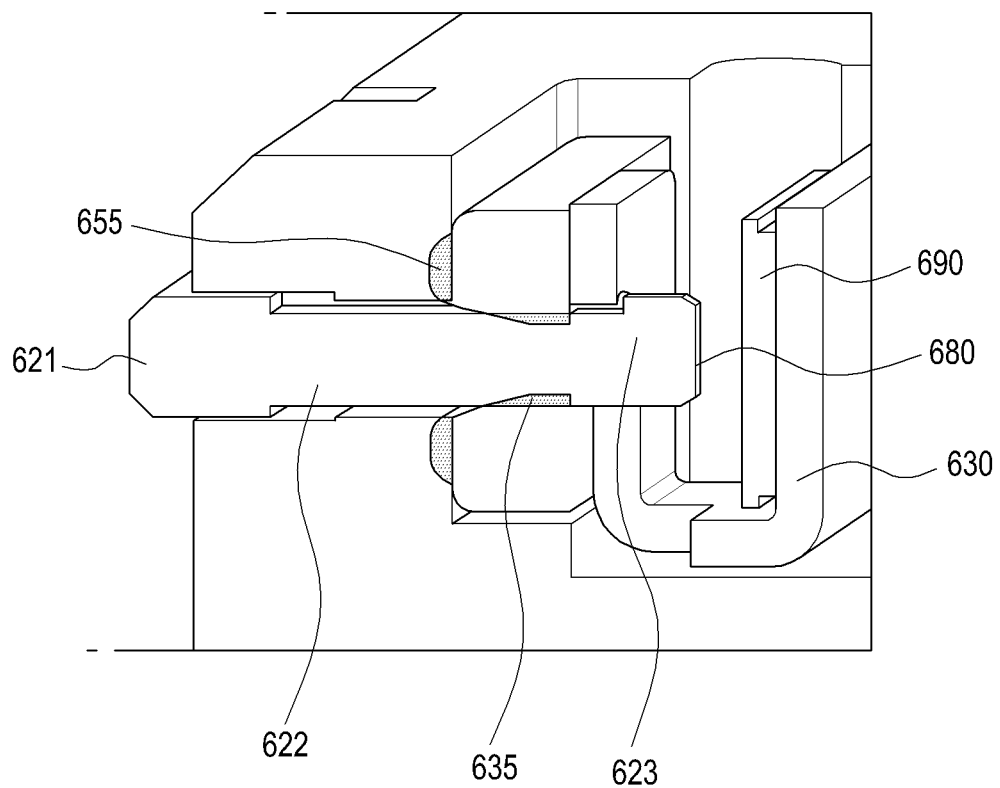

FIGS. 17 and 18 are a perspective view and a sectional view illustrating the components of the key module, before and after assembly, according to yet another embodiment of the present disclosure.

Referring to FIGS. 17 and 18, according to various embodiments of the present disclosure, the key module 600 may be disposed on a side face of the electronic device 10, and may include a key 620, a plate 630, and a first member 650.

The key module 600 may be disposed on the side face of the electronic device 10 such that the user may input data information and may deliver an electric signal to the inside of the electronic device 10 in order to acquire desired information.

The above-mentioned plate 630 and first member 650 are the same as those of the third embodiment, and thus, detailed descriptions thereof will be omitted. Hereinafter, the structure and arrangement of the key 620 will be described.

The key 620 may be disposed to have a size and shape to pass through the space formed between the front cover 10a and the rear cover 10b through the opening 21a of the bezel 2. For example, the key 620 may include a key button 621 disposed on the bezel 2, and a plurality of rods 622 disposed on and connected to the key button 621 and configured to be movable in a first direction in the formed space 23.

The key button 621 is disposed in the longitudinal direction of the bezel 2 on the side face of the electronic device 10 to allow the user to easily click in the state of gripping the electronic device 10.

The rods 622 may be disposed to be perpendicular to the longitudinal direction of the key button to be inserted into the electronic device 10, and may move along the insertion direction (e.g., the first direction). The rods 622 may include a first rod 622a disposed at the center of the key button 621 and second rods 622b disposed to be spaced apart from, and in parallel to each other with reference to the first rod 622a as a center.

There may be provided two or more rods 622b, and a step 623 may be formed on the outer surface of each of the second rods 622b in order to reduce an amount of separation or prevent the separation of the second rods 622b inserted into the plate 630.

For example, in an embodiment of the present disclosure, the step 623 formed on the outer surface of each of the second rods 622b may be formed in a shape facing the upper side of the key 621, and the step 623 of each of the second rods 622*b* may be inserted into an accommodation hole 631*a* of a first protrusion 631 after moving in the first direction through the pathway. Accordingly, when the steps 623 of the second rods 622*b* are inserted into the accommodation holes 631*a*, it is possible to reduce an amount of separation or prevent the second rods 622*b* from being separated.

In the present embodiment, it is described that the steps 623 are formed to face the upper side. Without being limited thereto, however, it is possible to variously change the steps 623, for example, to a step formed to face the lower side or the inner side of the second rods are formed to face the upper side, or a ring shaped step.

<Fifth Embodiment>

Figure 19:
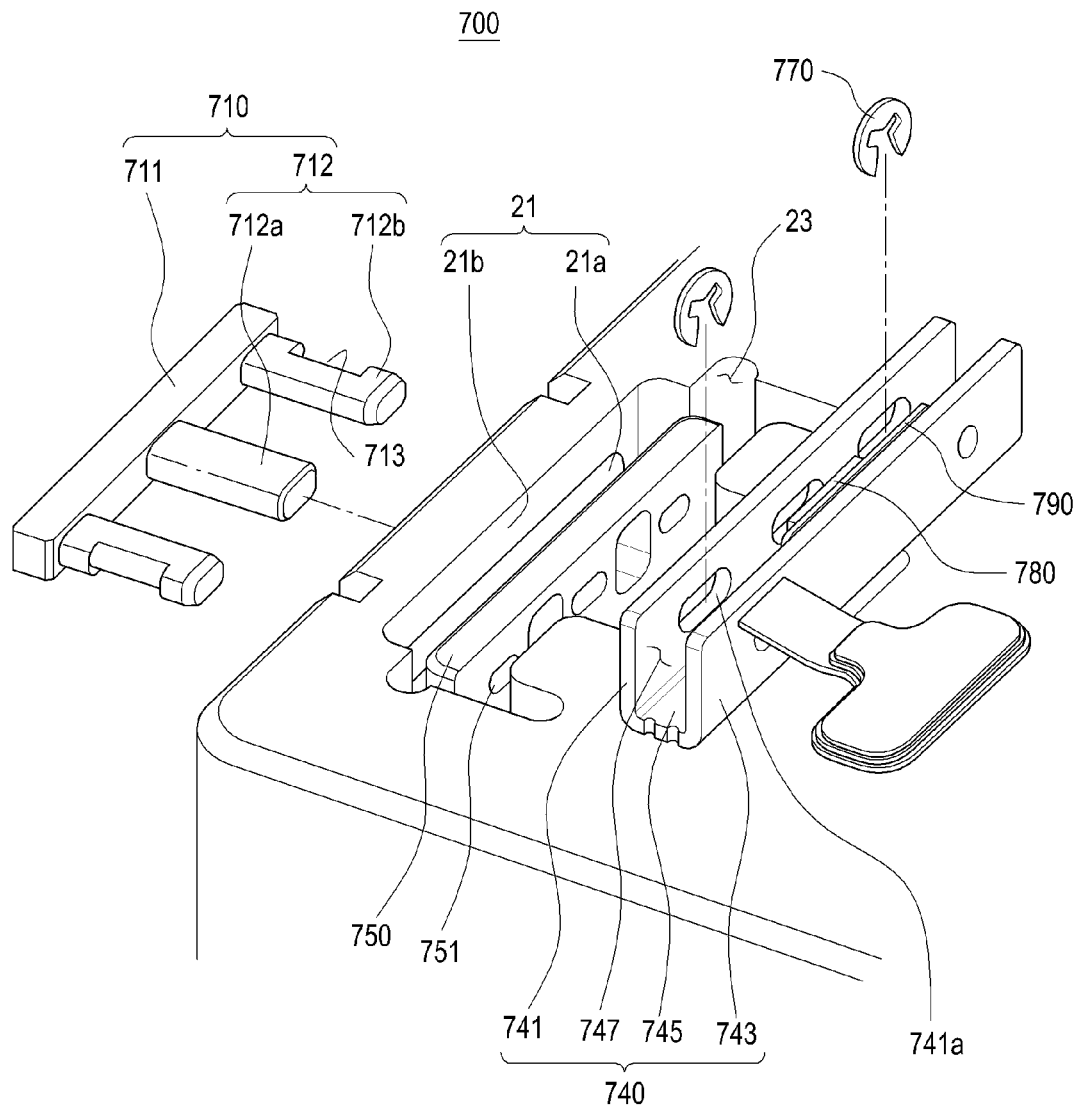
FIGS. 19 and 20 are perspective views illustrating the components of a key module, before and after a plate is in the assembled state, according to various embodiments of the present disclosure.

FIG. 19 is a perspective view illustrating the components of a key module, before and after a plate is in the assembled state, according to various embodiments of the present disclosure.

Referring to FIG. 19, according to various embodiments of the present disclosure, the key module 700 may be disposed on a side face of the electronic device 10, and may include a key 710, a plate 740, a first member 750, and a second member 770.

The above-mentioned key 710 and first member 750 are the same as those of the third embodiment, and thus, detailed descriptions thereof will be omitted. Hereinafter, descriptions will be described with respect to the structure and arrangement of the plate 740 and the second member 770.

The plate 740 may include first and second protrusions 741 and 743 that are disposed to be adjacent to the opening 21*a* of the bezel 2 within the space 23 formed between the front cover 10*a* and the rear cover 10*b*, and are spaced apart from each other. In addition, the plate 740 may include a support flat surface 745 that is parallel to the rear cover 10*b* within the space 23 formed between the front cover 10*a* and the rear cover 10*b*.

Between the first and second protrusions 741 and 743, a space is provided in which the rod 712 is movable in the first direction, and an accommodation space 747 is formed in which a dome button unit 780 and a flexible print circuit board 790 are disposed, so as to allow respective components to be mounted therein, thereby forming an integral bracket structure.

For example, the first protrusion 741 may be formed to have a length that is equal to that of the second protrusion 743, and may include an accommodation recess 741*a* in which at least a portion of the rod 712 may be accommodated. One face of the first protrusion 741 is disposed to be in contact with the first member 750 disposed in the seating recess 21*b* of the bezel 2, and the other face of the first protrusion 741 may form one face of the accommodation space 737. The center of the accommodation recess 741*a* of the first protrusion 741 and the center of the opening 21*a* of the bezel 2 may be positioned on the same line.

The second protrusion 743 is disposed in parallel to, and spaced away from, the first protrusion 741, and may serve as a support member on which various components may be mounted and supported. From the face forming the accommodation space 747 of the second protrusion 743 toward the outside, the flexible printed circuit board 790, the dome button unit 780, and the end of the rod 721*a* may be stacked in sequence.

Referring to FIG. 19 again, a plurality of second members 770 may be disposed to be coupled in a second direction that is different from the first direction after the first member 750 and the plate 740 are disposed on the space 23 and the key 710 is inserted from the outside.

The second member 770 may be made in the shape of a generally used E-ring, and may be implemented in a size and shape that are capable of reducing an amount of separation or preventing the separation of the second rods 712*b* by being coupled to the step 713 of the second rod 712*b*. Typically, the second member 770 may be formed as a hole, one side of which is opened.

The second member 770 may be disposed to come in contact with the first protrusion 731 at the one face thereof and at the same time, to be coupled to the second rods 712*b*, thereby preventing the key 710 from being separated to the outside.

<Sixth Embodiment>

Figure 20:
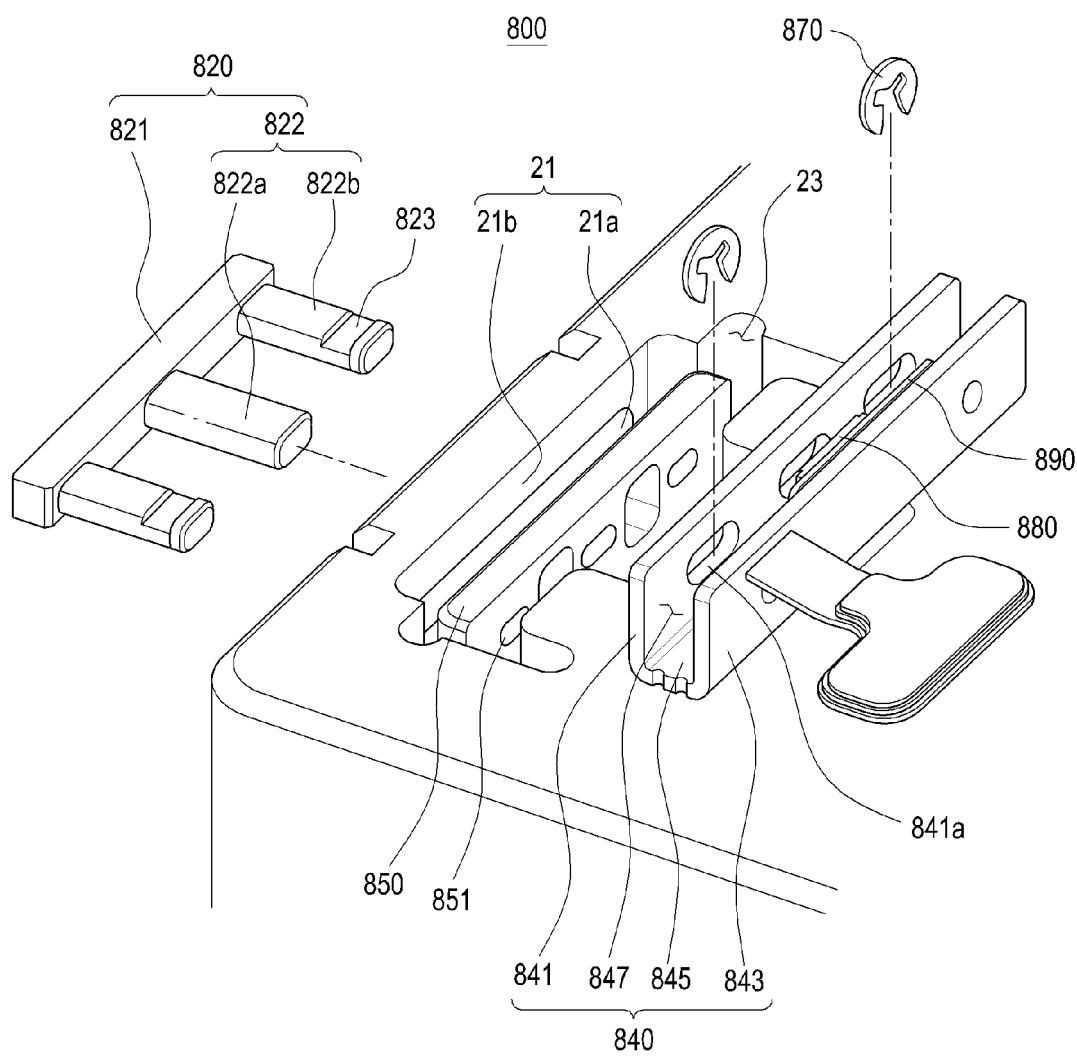

FIG. 20 is a perspective view illustrating the components of a key module, before and after a plate is in the assembled state, according to various embodiments of the present disclosure.

Referring to FIG. 20, according to various embodiments of the present disclosure, the key module 800 may be disposed on a side face of the electronic device 10, and may include a key 820, a plate 840, a first member 850, and a second member 870.

The above-mentioned key 820 and first member 850 are the same as those of the fourth embodiment, and thus, detailed descriptions thereof will be omitted. Hereinafter, descriptions will be described with respect to the structure and arrangement of the plate 840 and the second member 870.

The plate 840 may include first and second protrusions 841 and 843 that are disposed to be adjacent to the opening 21*a* of the bezel 2 within the space 23 formed between the front cover 10*a* and the rear cover 10*b*, and are spaced apart from each other. In addition, the plate 840 may include a support flat surface 845 that is parallel to the rear cover 10*b* within the space 23 formed between the front cover 10*a* and the rear cover 10*b*.

Between the first and second protrusions 841 and 843, a space is provided in which the rod 812 is movable in the first direction, and an accommodation space 847 is formed in which a dome button unit 880 and a flexible print circuit board 890 are disposed, so as to allow respective components to be mounted therein, thereby forming an integral bracket structure.

For example, the first protrusion 841 may be formed to have a length that is equal to that of the second protrusion 843, and may include an accommodation recess 841*a* in which at least a portion of the rod 812 may be accommodated. One face of the first protrusion 841 is disposed to be in contact with the first member 850 disposed in the seating recess 21*b* of the bezel 2, and the other face of the first protrusion 841 may form one face of the accommodation space 837. The center of the accommodation recess 841*a* of the first protrusion 841 and the center of the opening 21*a* of the bezel 2 may be positioned on the same line.

The second protrusion 843 is disposed in parallel to, and spaced away from, the first protrusion 841, and may serve as a support member on which various components may be mounted and supported. From the face forming the accommodation space 847 of the second protrusion 843 toward the outside, the flexible printed circuit board 890, the dome button unit 880, and the end of the rod 812*a* may be stacked in sequence.

Referring to FIG. 20, a plurality of second members 870 may be disposed to be coupled in a second direction that is different from the first direction after the first member 850 and the plate 840 are disposed on the space 23 and the key 820 is inserted from the outside.

The second member 870 may be made in the shape of a generally used E-ring, and may be implemented in a size and shape that are capable of preventing the separation of the second rod 812b by being coupled to the step 813 of the rod 812. Typically, the second member 870 may be formed as a hole, one side of which is opened.

The second member 870 may be disposed to come in contact with the first protrusion 831 at the one face thereof and at the same time, to be coupled to the second rods 812b, thereby preventing the key 810 from being separated to the outside.

<Seventh Embodiment>

Figure 21:
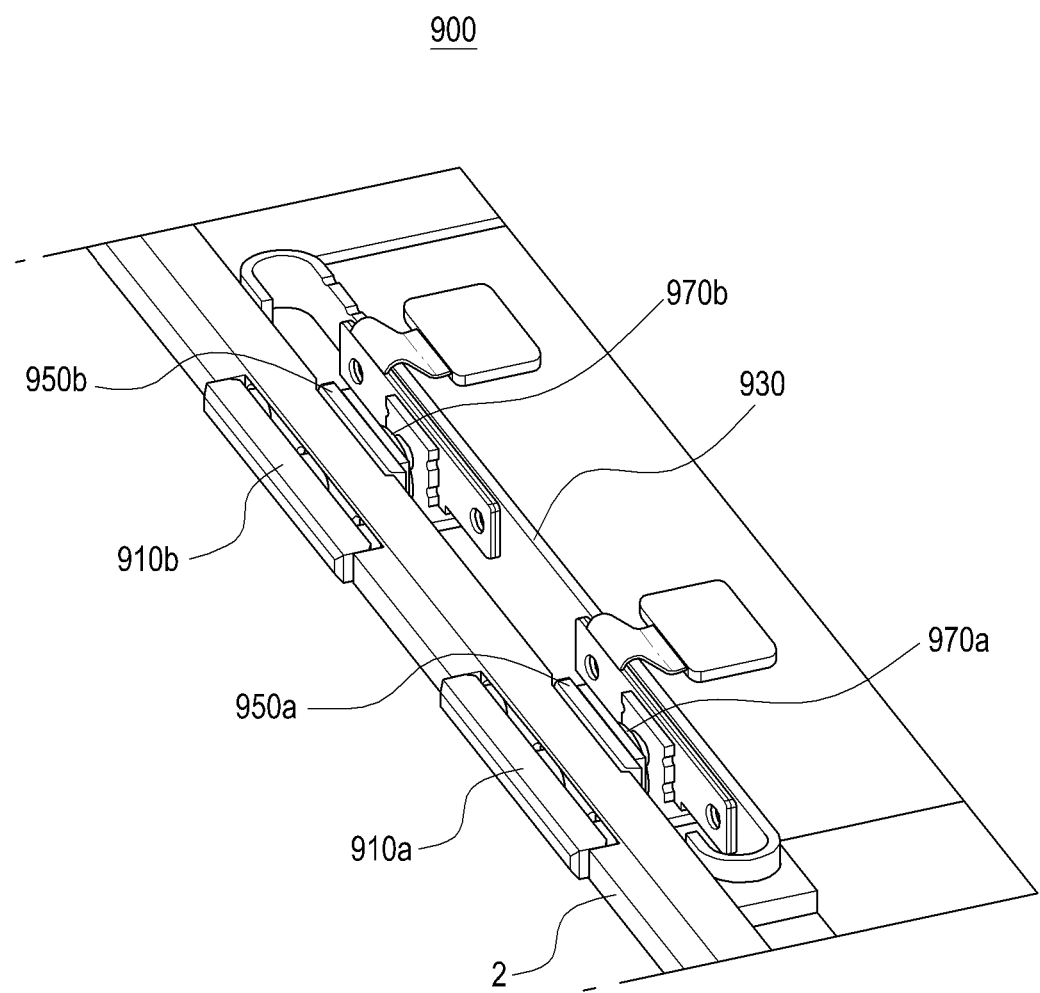
FIGS. 21 to 23 are perspective views illustrating the components of a key module, before assembly, according to various embodiments of the present disclosure.
Figure 22:
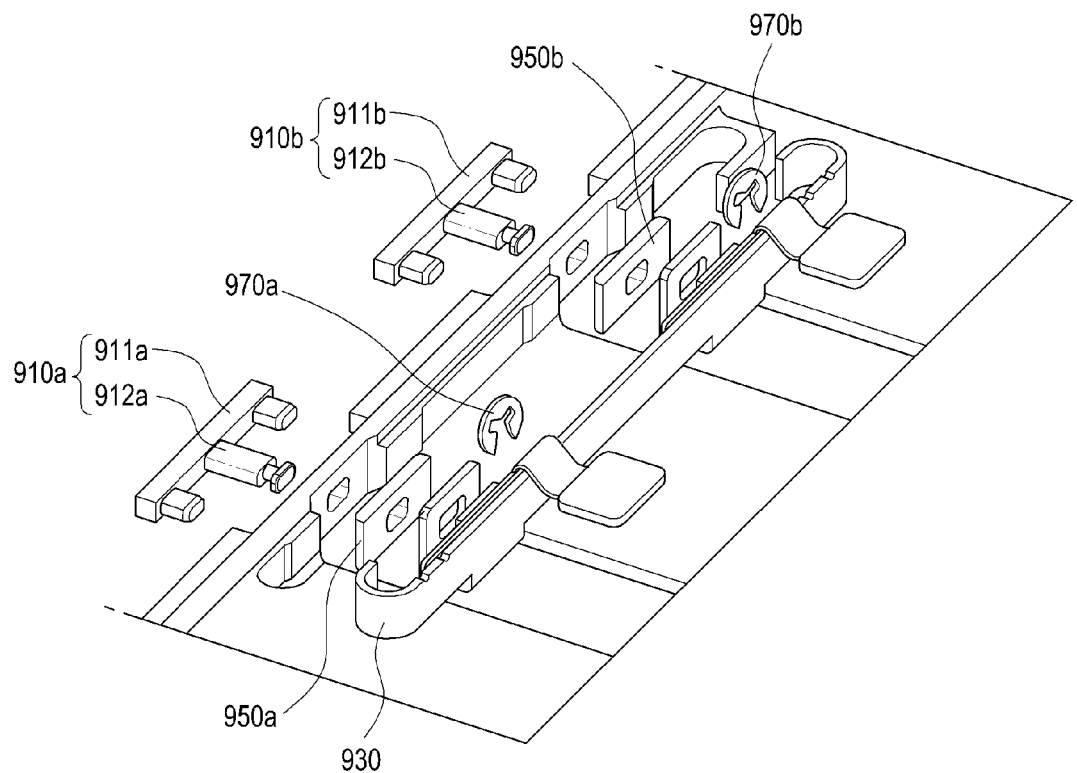
Figure 23:
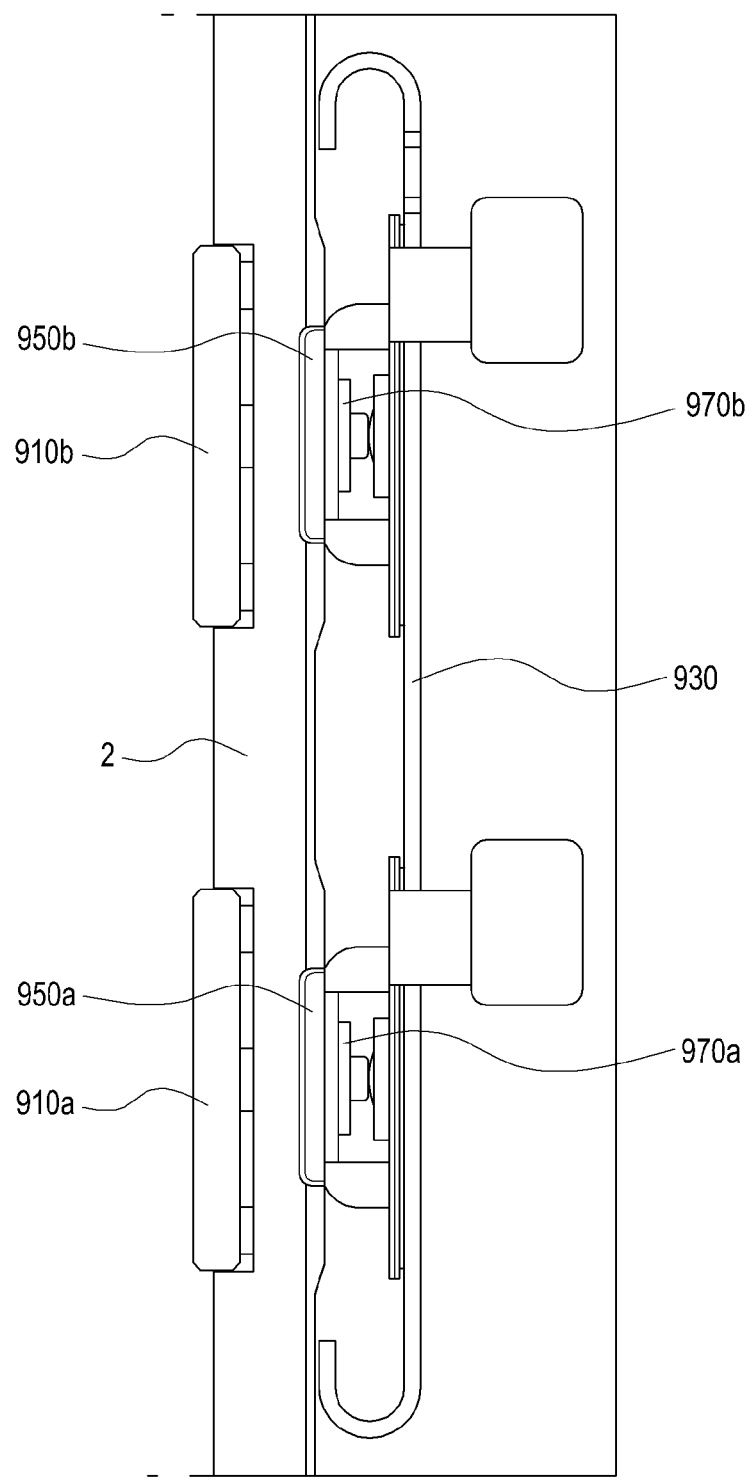

FIGS. 21 to 23 are perspective views illustrating the components of a key module, before and after assembly, according to various embodiments of the present disclosure.

Referring to FIGS. 21 to 23, according to various embodiments of the present disclosure, the key module 900 may be disposed on a side face of the electronic device 10, and may include a first key 910a, a second key 910b, a plate 930, two first members 950a and 950b, and two second members 970a and 970b.

The first key 910a, the second key 910b, the plate 930, the two first members 950a and 950b, and the two second members 970a and 970b are the same as the above-described first embodiment, except that the components may be implemented to be provided in pair in one plate 930, and thus, detailed descriptions thereof will be omitted.

One embodiment of the present disclosure may be provided with a plurality of keys 910a and 910b within one plate 930, which will also be variously applied to other embodiments.

Figure 24:
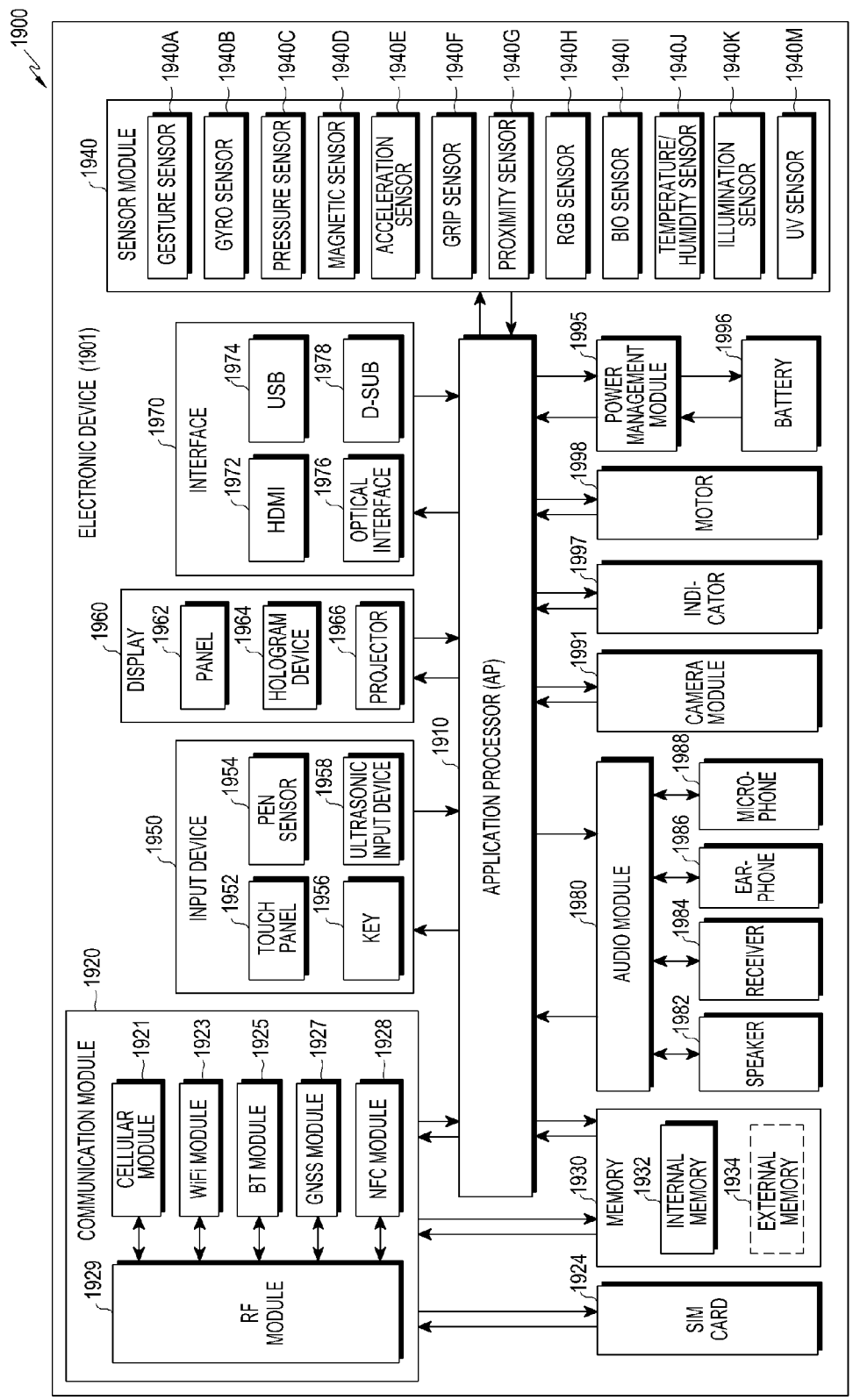
FIG. 24 is a block diagram illustrating a detailed configuration of an electronic device according to various embodiments of the present disclosure.

FIG. 24 is a block diagram of an electronic device 1901 according to various embodiments. The electronic device 1901 may include, for example, the whole or a portion of the electronic device 10 illustrated in FIG. 1. The electronic device 1901 may include at least one processor (e.g., an Application Processor (AP)) 1910, a communication module 1920, a subscriber identification module 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive, for example, an operating system or an application program so as to control a plurality of hardware or software components connected thereto, and may also perform various data processing and arithmetic operations. The processor 1910 may be implemented by, for example, a System-on-Chip (SoC). According to one embodiment, the processor 1910 may further include a Graphic Processing Unit (GPU) and/or an image signal processor. The processor 1910 may include at least some components (e.g., the cellular module 1921) among the components illustrated in FIG. 19. The AP 1910 may load a command or data received from at least one of the other components (e.g., a non-volatile memory) in a volatile memory to process the command and data, and may store various data in a non-volatile memory.

Figure 3:
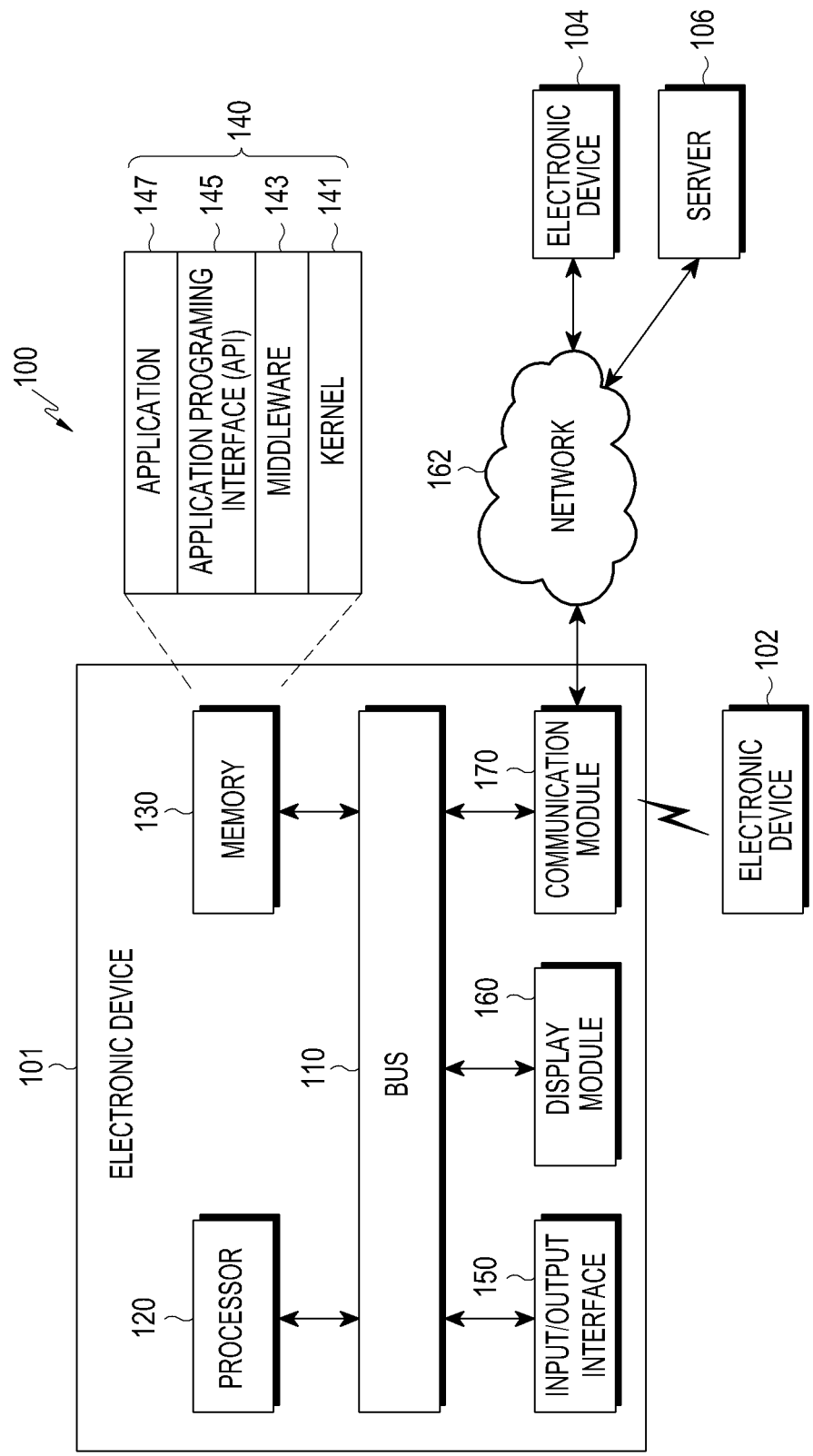
FIG. 3 is a view illustrating a network environment that includes an electronic device according to various embodiments of the present disclosure.

The communication module 1920 may have a configuration that is the same as or similar to the communication interface 170 of FIG. 3. The communication module 1920 may include, for example, a cellular module 1921, a WiFi module 1923, a Bluetooth module 1925, a GNSS module 1927 (e.g., GPS module, Glonass module, Beidou module, or Galileo module), an NFC module 1928, and a Radio Frequency (RF) module 1929.

The cellular module 1921 may provide, for example, a voice call, a video call, a message service, or an internet service through a communication network. According to one embodiment, the cellular module 1921 may perform discrimination and authentication of the electronic device 1901 within the communication network by using the subscriber identification module (e.g., a SIM card) 1924. According to one embodiment, the cellular module 1921 may perform at least some of the multimedia control functions that may be provided by the processor 1910. According to one embodiment, the cellular module 1921 may include a Communication Processor (CP).

Each of the WiFi module 1923, the Bluetooth module 1925, the GNSS module 1927, and the NFC module 1928 may include, for example, a processor to process data transmitted/received through a corresponding module. According to a certain embodiment, at least some (e.g., two or more) of the cellular module 1921, the WiFi module 1923, the Bluetooth module 1925, the GNSS module 1927, and the NFC module 1928 may be incorporated in a single Integrated Chip (IC) or an IC package.

The RF module 1929 may transmit/receive a communication signal (e.g., an RF signal). The RF module 1929 may include, for example, a transceiver, a Power Amp Module (PAM), a frequency filter, a Low Noise Amplifier (LNA), or an antenna. According to another embodiment, at least one of the cellular module 1921, the WiFi module 1923, the Bluetooth module 1925, the GNSS module 1927, and the NFC module 1928 may transmit/receive an RF signal through one or more separate RF modules.

The subscriber identification module 1924 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 1930 (e.g., memory 130) may include, for example, an internal memory 1932 or an external memory 1934. The internal memory 1932 may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 1934 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1934 may be functionally and/or physically connected to the electronic device 1901 through various interfaces.

For example, the sensor module 1940 may measure a physical quantity or may sense an operating status of the electronic device 1901, and may then convert the measured or sensed information into electric signals. The sensor module 1940 may include at least one of, for example, a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., RGB (Red, Green, Blue) sensor), a biometric sensor 1940I, a temperature/humidity sensor 1940J, an illuminance sensor 1940K, and a Ultra-Violet (UV) sensor 1940M. Additionally or alternatively, the sensor module 1940 may include, for example, an E-nose sensor, an ElectroMyoGraphy (EMG)

sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 1940 may further include a control circuit for controlling one or more sensors incorporated therein. In a certain embodiment, the electronic device 1901 may further include a processor configured to control the sensor module 1940 as a part of the processor 1910 or separate from the processor 1910 so as to control the sensor module 1940 while the processor 1910 is in the sleep state.

The input device 1950 may include a touch panel 1952, a (digital) pen sensor 1954, a key 1956, or an ultrasonic input device 1958. As the touch panel 1952, at least one of, for example, a capacitive type touch panel, a resistive type touch panel, an infrared type touch panel, and an ultrasonic type panel may be used. Also, the touch panel 1952 may further include a control circuit. The touch panel 1952 may further include a tactile layer so as to provide a tactile reaction to the user.

The (digital) pen sensor 1954 may be, for example, a portion of the touch panel or may include a separate recognition sheet. The key 1956 may include, for example, a physical button, an optical key, or a keypad. The ultrasonic input device 1958 may sense, through a microphone (e.g., a microphone 1988), ultrasonic waves generated by an input tool so as to confirm data corresponding to the sensed ultrasonic waves.

The display 1960 (e.g., the display 160) may include a panel 1962, a hologram device 1964, or a projector 1966. The panel 1962 may include a configuration that is the same as or similar to that of the display 160 of FIG. 1. The panel 1962 may be implemented to be, for example, flexible, transparent, or wearable. The panel 1962 may be configured as a single module with the touch panel 1952. The hologram device 1964 may show a stereoscopic image in the air using interference of light. The projector 1966 may project light onto a screen so as to display an image. The screen may be located, for example, inside or outside the electronic device 1901. According to one embodiment, the display 1960 may further include a control circuit to control the panel 1962, the hologram device 1964, or the projector 1966.

The interface 1970 may include, for example, a High-Definition Multimedia Interface (HDMI) 1972, a Universal Serial Bus (USB) 1974, an optical interface 1976, or a D-subminiature (D-sub) 1978. For example, the interface 1970 may be included in the communication interface 170 illustrated in FIG. 3. Additionally or alternatively, the interface 1970 may include, for example, a Mobile High-definition Link (MHL) interface, a Secure Digital (SD) card/Multi-Media Card (MMC) interface, or an Infrared Data Association (IrDA) standard interface.

The audio module 1980 may bi-directionally convert, for example, sound and electric signals. At least some of the components of the audio module 1980 may be included in, for example, the input/output interface 150 illustrated in FIG. 3. The audio module 1980 may process sound information input or output through, for example, a speaker 1982, a receiver 1984, an earphone 1986, or a microphone 1988.

The camera module 1991 is a device that is capable of photographing, for example, a still image and a video image, and according to one embodiment, the camera module 1991 may include at least one image sensor (e.g., a front sensor or a rear sensor), a lens, an Image Signal Processor (ISP), or a flash (e.g., LED or xenon lamp).

The power management module 1995 may manage, for example, the electric power of the electronic device 1901. According to one embodiment, the power management module 1995 may include a Power Management Integrated Circuit (PMIC), a charger Integrated Circuit (IC), or a battery or fuel gauge. The PMIC may be configured as a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). For example, the battery gauge may measure the residual capacity of the battery 1996, and a voltage, a current, or a temperature during the charge. The battery 1996 may include, for example, a rechargeable battery and/or a solar battery.

The indicator 1997 may indicate a specific status of the electronic device 1901 or of a part thereof (e.g., AP 1910), such as a booting status, a message status, or a charged status. The motor 1998 may convert an electric signal into a mechanical vibration, and may generate, for example, a vibration or a haptic effect. Although not illustrated, the electronic device 1901 may include a processor (e.g., a GPU) to support a mobile TV. The processor to support a mobile TV may process media data according to the standards of, for example, Digital Multimedia Broadcasting (DMB), Digital Video Broadcasting (DVB), or media-Flow™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 25:
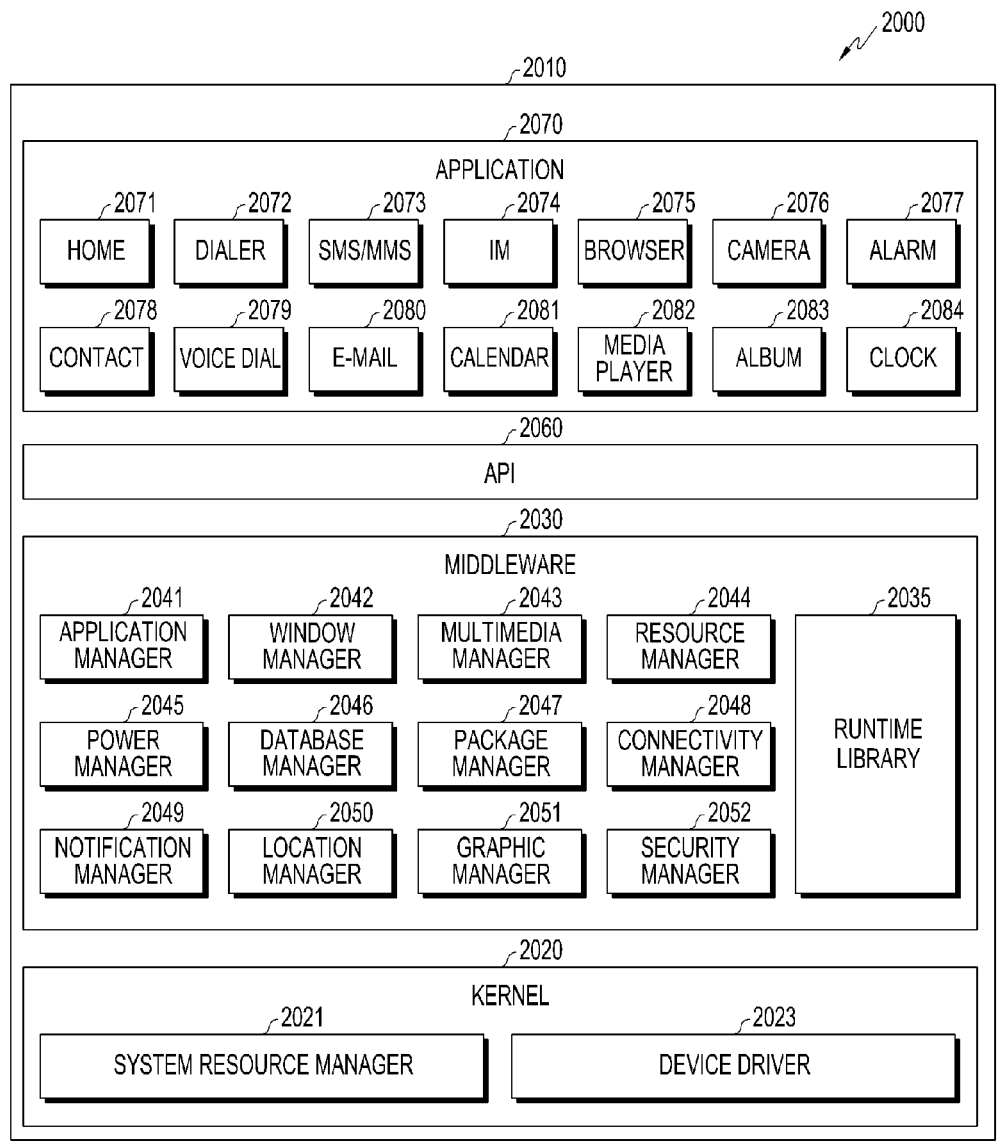
FIG. 25 is a block diagram illustrating a program module according to various embodiments.

FIG. 25 is a block diagram illustrating a program module according to various embodiments. According to one embodiment, a program module 2010 (e.g., the program 140) may include an Operating System (OS) that controls resources associated with an electronic device (e.g., the electronic device 10) and/or various applications (e.g., the application program 147) that are driven on the operating system. The operating system may be, for example, Android, iOS, Windows, Symbian, Tizen, or Bada.

The program module 2010 may include a kernel 2020, a middleware 2030, an Application Programming Interface (API) 2060, and/or an application 2070. At least a part of the program module 2010 may be preloaded on the electronic device, or may be downloaded from an external electronic device (e.g., the device 102 or 104, or the server 106).

The kernel 2020 (e.g., the kernel 141) may include, for example, a system resource manager 2021 and/or a device driver 2023. The system resource manager 2021 may perform, for example, a control, allocation, or recovery of a system resource. According to one embodiment, the system resource manager 2021 may include, for example, a process management unit, a memory management unit, or a file system management unit. The device driver 2023 may include, for example, a display driver, a camera driver, a Bluetooth driver, a common memory driver, a USB driver, a keypad driver, a WiFi driver, an audio driver, or an Inter-Process Communication (IPC) driver.

The middleware 2030 may provide, for example, a function that is commonly required by the applications 2070, or may provide various functions to the applications 2070 through the API 2060 such that the applications 2070 can efficiently use the limited system resources within the electronic device. According to one embodiment, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module that is used by a compiler in order to add a new function through a program language while the applications 2070 are executed. The runtime library 2035 may perform, for example, input/output management, memory management, or a function for an arithmetic function.

The application manager 2041 may manage, for example, a life cycle of at least one application among the applications 2070. The window manager 2042 may manage a GUI resource that is used in a screen. The multimedia manager 2043 may grasp a format required for reproducing various media files, and may perform encoding or decoding of the media files by using a codec that is suitable for the corresponding format. The resource manager 2044 may manage a resource, such as a source code, a memory, or a storage space, of at least one application among the applications 2070.

The power manager 2045 is operated together with, for example, a Basic Input/Output System (BIOS) so as to manage a battery or a power source, and may provide, for example, power information that is required for operating the electronic device. The database manager 2046 may generate, retrieve, or change a database to be used by at least one application among the applications 2070. The package manager 2047 may manage the installation or update of an application that is distributed in the form of a package file.

The connectivity manager 2048 may manage, for example, a wireless connection of WiFi, Bluetooth, or the like. The notification manager 2049 may display or notify events, such as an arrival message, appointment, and proximity notification in a manner that does not disturb the user. The location manager 2050 may manage position information of the electronic device. The graphic manager 2051 may manage a graphic effect to be provided to the user or a user interface associated therewith. The security manager 2052 may provide all security functions required for, for example, system security, or user authentication. According to one embodiment, in the case where the electronic device (e.g., the electronic device 10) includes a phone function, the middleware 2030 may include a telephony manager to manage a voice or video call function of the electronic device.

The middleware 2030 may include a middleware module that forms a combination of various functions of the above-described components. The middleware 2030 may provide a module that is specialized for each kind of operation system in order to provide differentiated functions. In addition, the middleware 2030 may dynamically delete some of the existing components or add new components.

The API 2060 (e.g., the API 145) is, for example, a collection of API programming functions, and may be provided in different configurations according to operation systems. For example, Android or iOS may provide one API set for each platform and Tizen may provide two or more API sets for each platform.

The applications 2070 (e.g., the application program 147) may include, for example, one or more applications that can execute, for example, the functions of home 2071, dialer 2072, SMS/MMS 2073, Instant Message (IM) 2074, browser 2075, camera 2076, alarm 2077, contact 2078, voice dial 2079, e-mail 2080, calendar 2081, media player 2082, album 2083, and watch 2084, health care (e.g., measurement of a quantity of motion, or blood sugar), or provision of environmental information (e.g., provision of atmospheric pressure, humidity, or temperature information).

According to one embodiment, the applications 2070 may include an application that supports information exchange between the electronic device (e.g., the electronic device 10) and the external electronic devices (e.g., the electronic devices 102 and 104) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 102 and 104). In addition, the notification relay application may receive notification information from, for example, an external electronic device, and may provide the notification information to the user.

The device management application may manage (e.g., install, delete, or update) at least one function of an external electronic device (e.g., the electronic device 102 or 104) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to one embodiment, the applications 2070 may include an application designated according to an attribute of an external electronic device (e.g., the electronic device 102 or 104) (e.g., a healthcare application of a mobile medical device). According to one embodiment, the applications 2070 may include an application received from an external electronic device (e.g., the server 106 or the electronic device 102 or 104). According to one embodiment, the applications 2070 may include a preloaded application or a third party application that is capable of being downloaded from the server. The names of the components of the program module 2010 according to the illustrated embodiment may vary depending on the kind of operation system.

According to various embodiments, at least a portion of the program module 2010 may be implemented by software, firmware, hardware, or a combination of two or more thereof. At least a portion of the program module 2010 may be implemented (e.g., executed) by, for example, a processor (e.g., the processor 120). At least a portion of the program module 2010 may include, for example, a module, a program, a routine, a set of instructions, or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device comprising:
   a front cover that forms a front face of the electronic device;
   a rear cover that forms a rear face of the electronic device;
   a bezel that surrounds at least a portion of a space formed between the front cover and the rear cover and includes a first portion including an opening;
   a display device that is disposed within the space and includes a screen area exposed through the front cover;
   a plate that includes a support surface parallel to the rear cover within the space, and includes first and second protrusions disposed adjacent to the opening and spaced apart from each other, the first and second protrusions being disposed not to be in contact with the first portion and to include an accommodation hole that provides a pathway leading to the opening;
   a key having a size and shape to pass through the pathway and the opening and inserted into the pathway and the opening to be movable in a first direction; and
   a first member that includes a via hole through which a portion of the key passes, and is disposed between the first portion of the bezel and the first protrusion and between the first portion of the bezel and the second protrusion to hermetically seal the space from outside of the electronic device.

2. The electronic device of claim 1, further comprising a dome button unit disposed within the space,
   wherein the dome button unit is configured to be partially deformed by a movement of the key when the key receives pressure in the first direction from the outside.

3. The electronic device of claim 2, further comprising a flexible printed circuit board disposed adjacent to the dome button unit,
   wherein the flexible printed circuit board is configured such that, when the key receives the pressure in the first direction from the outside, an electric signal is generated by the dome button unit.

4. The electronic device of claim 1, wherein the rear cover and the bezel are integrally formed.

5. The electronic device of claim 1, wherein the rear cover and the bezel comprise an identical metal material.

6. The electronic device of claim 1, wherein the key includes a key button disposed on the bezel and a rod disposed perpendicular to the key button and configured to be inserted into the space and move in the first direction, and
   the rod includes a step formed on an outer surface thereof to reduce an amount of or prevent separation of the rod from the plate.

7. The electronic device of claim 6, wherein the first member is inserted into and disposed in a seating recess provided inside the bezel, and is formed to elastically enclose a periphery of the rod so as to reduce an amount of or prevent a fluid from infiltrating into inside of the electronic device.

8. The electronic device of claim 7, wherein the first member includes a first waterproof contact face formed by being in contact with the key on the first direction where the key moves, and a second waterproof contact face formed by being in contact with an inside of the bezel on a second direction that is different from the first direction.

9. The electronic device of claim 8, wherein centers of the opening of the bezel, the via hole of the first member, and the accommodation hole of the plate are arranged on a same line.

10. The electronic device of claim 6, wherein, in the plate, the support surface is flat and is configured to support the first and second protrusions, and
    a dome button unit is provided in an accommodation space formed between the first and second protrusions and is configured to come in contact with the rod when the key moves in the first direction.

11. The electronic device of claim 10, wherein the first protrusion is provided with at least one accommodation hole such that at least a portion of the rod is accommodated and coupled to the accommodation space.

12. The electronic device of claim 11, further comprising a second member coupled to the step formed on the outer surface of the rod when the rod is inserted into the accommodation hole and configured to reduce an amount of or prevent a separation of the key from the plate.

13. The electronic device of claim 10, wherein the accommodation hole is opened in a face that faces in a second direction to be coupled to the rod in the second direction that is different from the first direction.

14. The electronic device of claim 13, wherein, after the rod inserted into the first direction is inserted in the accommodation hole of the first protrusion, an inner surface of the first protrusion and the step formed on the outer surface of the rod are coupled to each other to reduce an amount of or prevent a separation of the key from the plate.

15. The electronic device of claim 14, wherein the plate is configured to come in contact with an end of the rod of the key, and, when the key receives pressure in the first direction from the outside, the dome button unit is partially deformed by a movement of the rod.

16. The electronic device of claim 1, wherein the key includes a key button disposed on the bezel and a plurality of rods inserted into the space and moved in the first direction, and the rods include a first rod disposed at a center of the key button and second rods disposed to be spaced apart from, and to be parallel to, each other with reference to the first rod as a center.

17. The electronic device of claim 16, wherein, in the plate, the support surface is flat and supports the first and second protrusions, and a dome button unit is provided in an accommodation space formed between the first and second protrusions and is configured to come in contact with the rod that moves in the first direction.

18. The electronic device of claim 17, wherein the accommodation hole is opened in a face that faces in a second direction that is different from the first direction such that the second rods are coupled to the rod in the second direction.

19. The electronic device of claim 18, wherein, after the second rods inserted in the first direction are inserted into the first protrusion, an inner surface of the first protrusion and a step formed on an outer surface of the rod are coupled to each other to reduce an amount of or prevent separation of the key from the plate.

20. The electronic device of claim 19, wherein coupling of the second rods and the plate is configured to:

reduce an amount of separation or prevent the second rods from being separated from the plate by pressure applied from the key button, and transfer the pressure to the inside of the electronic device when the pressure is generated at a portion other than a center of the key button, wherein the applied pressure is soundly transferred to the inside of the electronic device.

21. The electronic device of claim 20, wherein the second rods are disposed to be spaced apart from the first rod at an equal interval and to be parallel to each other, and each of the second rods includes a step formed in a third direction that is different from the first direction.

22. The electronic device of claim 21, wherein the third direction of the step formed on the each of the second rods is perpendicular to the first direction.

23. A portable electronic device comprising:

a main body;

a key comprising at least one rod, wherein the key is disposed on a side face of the main body and the at least one rod is configured to be inserted into the side face of the main body;

a plate including at least one protrusion disposed inside the main body and configured to accommodate an end of the at least one rod; and a first member disposed between the key and the plate and including at least one via hole through which the at least one rod passes, wherein the key includes a key button disposed on a side face of the main body and a rod disposed perpendicular to the key button and configured to be inserted into the main body and move in a first direction, and the rod includes a step formed on an outer surface thereof to reduce an amount of or prevent separation of the rod from the plate.

* * * * *